United States Patent
Wickham

(10) Patent No.: US 6,370,154 B1
(45) Date of Patent: Apr. 9, 2002

(54) TELECOMMUNICATIONS SYSTEM CRAFT INTERFACE DEVICE WITH BROADBAND END-TO-END CROSS-CONNECT CAPABILITY

(75) Inventor: Gregory Wickham, Petaluma, CA (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/000,663

(22) Filed: Dec. 30, 1997

(51) Int. Cl.[7] .............................................. H04L 12/66
(52) U.S. Cl. ...................... 370/463; 370/458; 709/224; 709/223
(58) Field of Search ................................ 370/259, 271, 370/261, 248, 254, 310, 329, 341, 459, 463, 352; 709/223, 224, 228

(56) References Cited

U.S. PATENT DOCUMENTS

| | | | |
|---|---|---|---|
| 4,833,592 A | 5/1989 | Yamanaka | 364/138 |
| 4,942,540 A | 7/1990 | Black et al. | 709/228 |
| 5,021,968 A | 6/1991 | Ferketic | 345/969 |
| 5,049,873 A | 9/1991 | Robins et al. | 340/825.06 |
| 5,175,800 A | 12/1992 | Galis et al. | 706/45 |
| 5,295,244 A | 3/1994 | Dev et al. | 345/357 |
| 5,436,890 A | 7/1995 | Read et al. | 370/352 |
| 5,629,978 A * | 5/1997 | Blumhardt | 370/271 |
| 5,684,947 A | 11/1997 | Horie | 714/37 |
| 5,687,315 A | 11/1997 | Tezuka et al. | 345/969 |
| 5,761,429 A | 6/1998 | Thompson | 709/224 |
| 5,793,974 A | 8/1998 | Messinger | 709/224 |
| 5,794,006 A | 8/1998 | Sanderman | 709/223 |
| 5,802,530 A | 9/1998 | Van Hoff | 707/513 |
| 5,809,286 A | 9/1998 | McLain et al. | 395/500.44 |
| 5,867,689 A | 2/1999 | McLain et al. | 395/500.44 |
| 5,878,411 A | 3/1999 | Burroughs et al. | 707/4 |
| 5,881,059 A * | 3/1999 | Deschaine | 370/337 |
| 5,910,803 A | 6/1999 | Grau et al. | 345/357 |
| 5,935,209 A | 8/1999 | Budhraja et al. | 709/223 |
| 5,936,622 A | 8/1999 | Halveson et al. | 345/339 |
| 5,950,204 A | 9/1999 | Ikeda | 707/102 |
| 5,958,012 A | 9/1999 | Battat et al. | 709/224 |
| 6,008,814 A | 12/1999 | Baldwin et al. | 345/427 |

OTHER PUBLICATIONS

"Object–Oriented State Machines," by Ted Faison, *Software Development*, Magazine, Sep. 1993.
William Stallings, "data and Computer Communications, 4th Ed," pp. 175–179 and 273–279, 1994.

* cited by examiner

Primary Examiner—Douglas Olms
Assistant Examiner—Ricardo M. Pizarro
(74) Attorney, Agent, or Firm—Jackson Walker L.L.P.

(57) ABSTRACT

A craft interface device for accessing a telecommunications network having several levels or layers of interactive structure has a graphical user interface for displaying on a monitor a sequence graphical representations of operatively interconnected objects in a respective layer of the telecommunications network, whereby a user can navigate graphically through the network from a highest hierarchical level of objects to a lowest hierarchical level of objects and operational interrelationships. The graphical user interface is operatively connected to a display interactive user input component (e.g., a mouse) for detecting user selection via the input component of a broadband first end point displayed in a first window by the graphical user interface and a broadband second end point displayed in a second window by the graphical user interface. Connection componentry is operatively connected to the graphical user interface and to the network for automatically establishing a broadband end-to-end cross-connection in the network in response to the user selection via the input component of the first end point and the second end point.

17 Claims, 16 Drawing Sheets

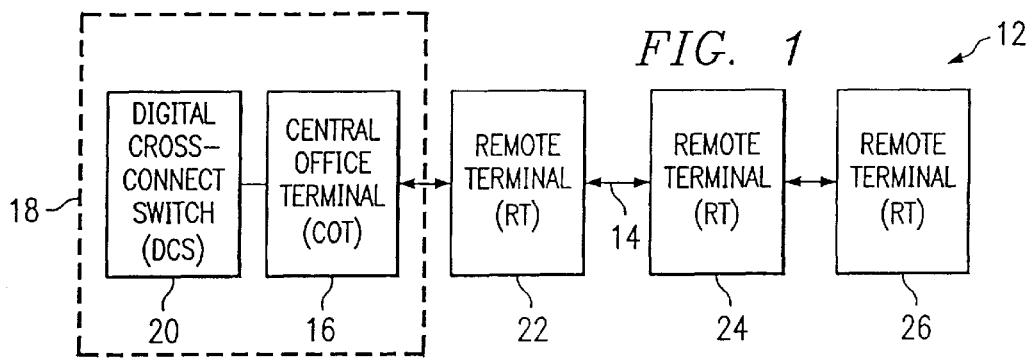
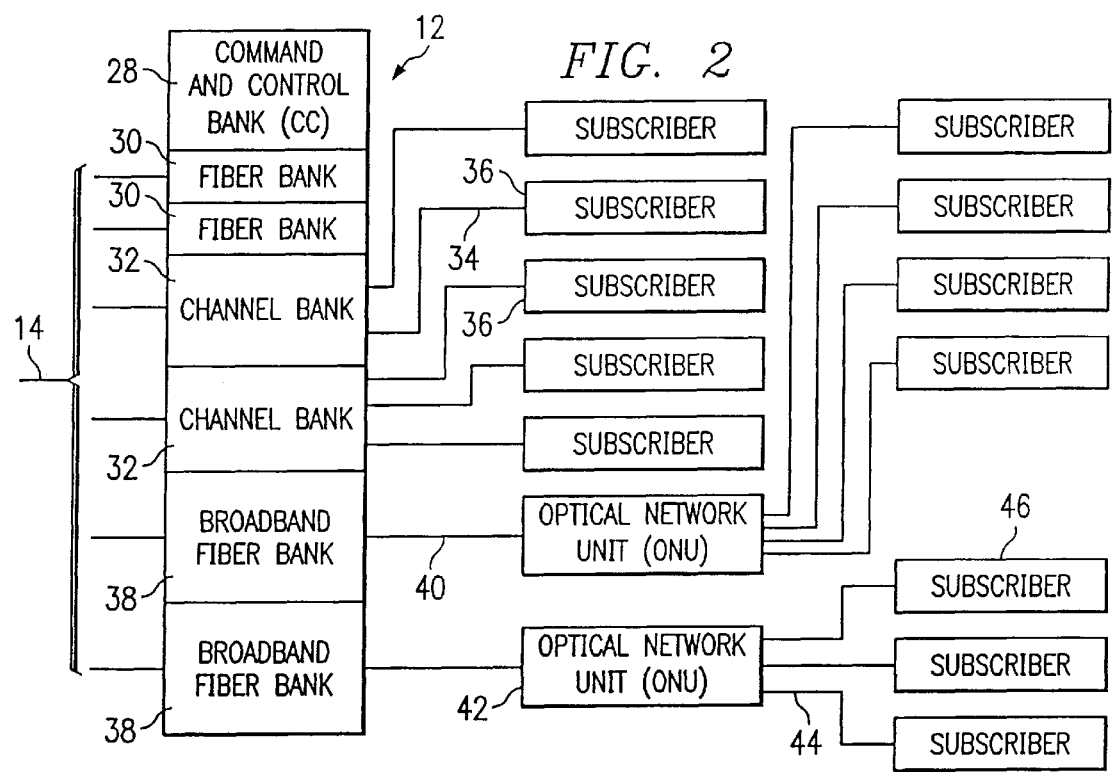
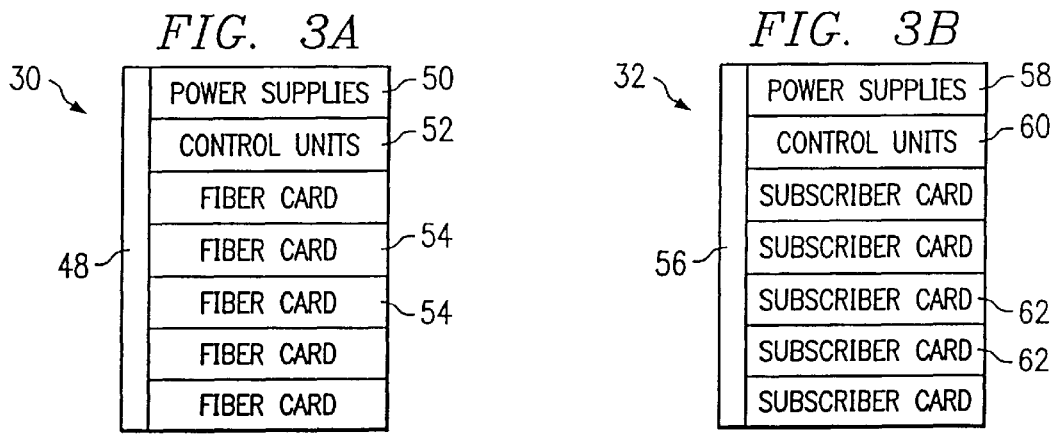

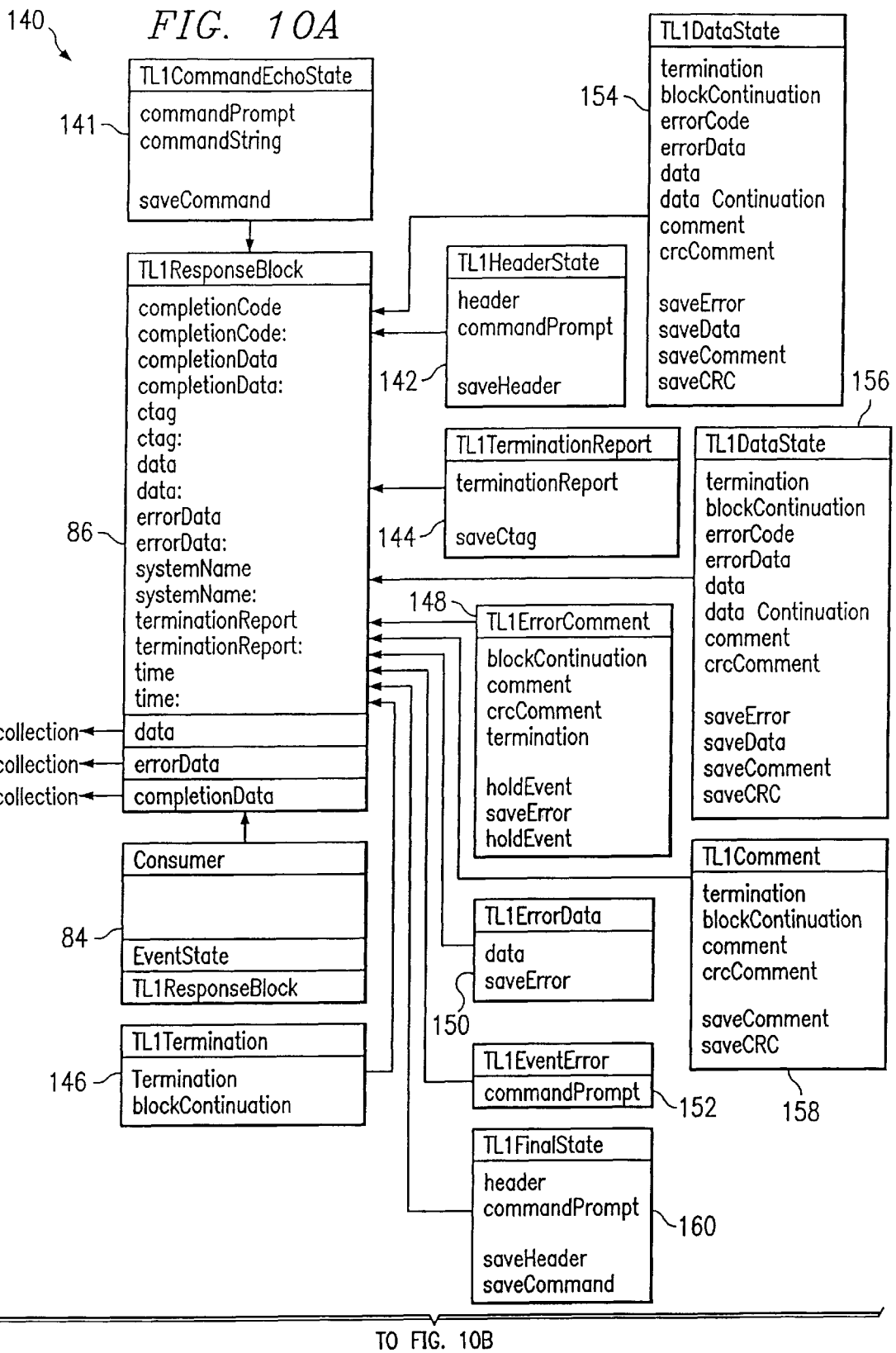

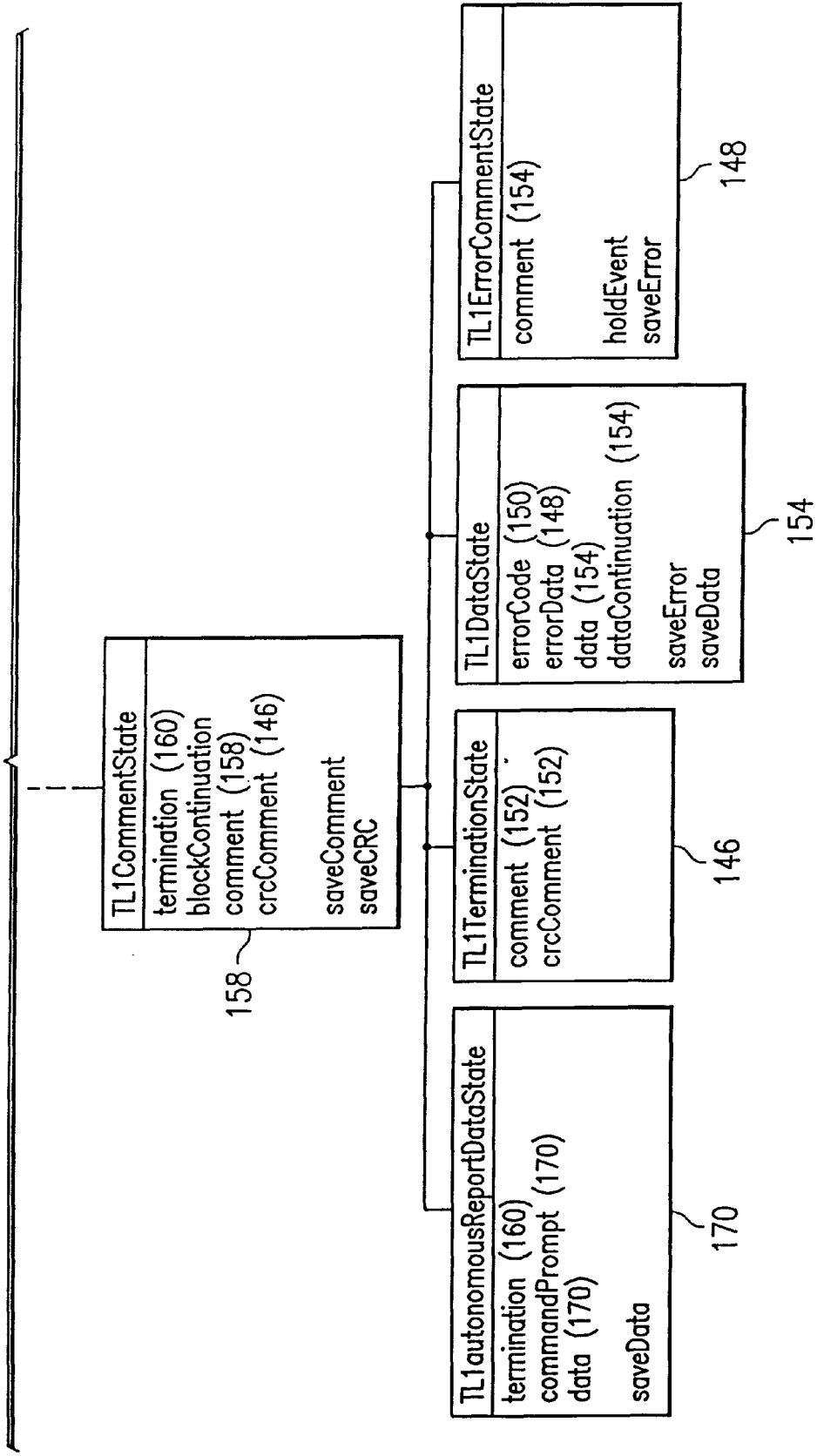

FIG. 14A

| EVENTS\(WAIT FOR)\STATES | TL1Header (142) | TL1TermReport (144) | TL1Data (154) | TL1ErrorComment (148) |
|---|---|---|---|---|
| #header | saveHeader=>(144) | error=>(166) | error=>(166) | error=>(166) |
| #terminationReport | error=>(152) | saveCtag=> ? holdEvent=> | error=>(152) | error=>(152) |
| #termination | error=>(152) | error=>(152) | noop=>(160) | error=>(160) |
| #blockContinuation | error=>(152) | error=>(152) | noop=>(160) | holdEvent=>(160) |
| #commandPrompt | saveCommand=>(142) | error=>(152) | error=>(152) | error=>(152) |
| #errorCode | error=>(152) | error=>(152) | saveError=>(150) | error=>(152) |
| #errorData | error=>(152) | error=>(152) | saveError=>(148) | error=>(152) |
| #data | error=>(152) | error=>(152) | saveData=>(154) | error=>(152) |
| #dataContinuation | error=>(152) | error=>(152) | saveData=>(154) | error=>(152) |
| #comment | error=>(152) | error=>(152) | saveComment=>(158) | saveError=>(154) |
| #blankLine | noop=>(142) | noop=>(154) | noop=>(154) | noop=>(148) |
| #unidentified | error=>(152) | error=>(152) | error=>(152) | error=>(152) |
| #crc Comment | error=>(152) | error=>(152) | saveCRC=>(146) | holdEvent=>(146) |
| #inProgress | saveCommand=>(160) | error=>(152) | error=>(152) | error=>(152) |
| #reset ** | reset=>(164) | reset=>(164) | reset=>(164) | reset=>(164) |
|  |  |  |  |  |
| #commandString | error=>(152) | error=>(152) | error=>(152) | error=>(152) |
| #autonomousMsg | error=>(152) | error=>(152) | error=>(152) | error=>(152) |

| TL1ErrorData (150) | TL1Comment (158) | TL1EventError (152) | TL1Final (160) | TL1Termination (146) |
|---|---|---|---|---|
| error=>(166) | error=>(166) | error=>(166) | saveHeader=>(144) | error=>(166) |
| error=>(152) | error=>(152) | error=>(152) | error=>(152) | error=>(152) |
| error=>(152) | noop=>(160) | error=>(152) | error=>(152) | noop=>(160) |
| error=>(152) | noop=>(160) | error=>(152) | error=>(152) | noop=>(160) |
| error=>(152) | error=>(152) | noop=>(142) | saveCommand=>(142) | error=>(152) |
| error=>(152) | error=>(152) | error=>(152) | error=>(152) | error=>(152) |
| error=>(152) | error=>(152) | error=>(152) | error=>(152) | error=>(152) |
| saveError=>(148) | error=>(152) | error=>(152) | error=>(152) | error=>(152) |
| error=>(152) | error=>(152) | error=>(152) | error=>(152) | error=>(152) |
| error=>(152) | saveComment=>(158) | error=>(152) | error=>(152) | error=>(152) |
| noop=>(150) | noop=>(158) | noop=>(152) | noop=>(160) | noop=>(146) |
| error=>(152) | error=>(152) | error=>(152) | error=>(152) | error=>(152) |
| error=>(152) | saveCRC=>(146) | error=>(152) | error=>(152) | error=>(152) |
| error=>(152) | error=>(152) | error=>(152) | error=>(152) | error=>(152) |
| reset=>(164) | reset=>(164) | reset=>(164) | reset=>(164) | reset=>(164) |
|  |  |  |  |  |
| error=>(152) | error=>(152) | error=>(152) | error=>(152) | error=>(152) |
| error=>(152) | error=>(152) | error=>(152) | error=>(152) | error=>(152) |

FIG. 14C

| | TL1PromptSync (164) | TL1CommandEcho | TL1AutonomousReport (166) | TL1AutonomousReportData (170) |
|---|---|---|---|---|
| | noop=>(164) | error=>(152) | error=>(152) | error=>(152) |
| | noop=>(164) | error=>(152) | ?holdEvent=>(154) | error=>(152) |
| | noop=>(164) | error=>(152) | error=>(152) | noop=>(160) |
| | noop=>(164) | error=>(152) | error=>(152) | noop=>(160) |
| | saveCommand=>(142) | saveCommand=>(164) | error=>(152) | saveCommand=>(170) |
| | noop=>(164) | error=>(152) | error=>(152) | error=>(152) |
| | noop=>(164) | error=>(152) | error=>(152) | error=>(152) |
| | noop=>(164) | error=>(152) | error=>(152) | saveData=>(170) |
| | noop=>(164) | error=>(152) | error=>(152) | saveData=>(170) |
| | noop=>(164) | error=>(152) | error=>(152) | error=>(152) |
| | noop=>(164) | noop=> | noop=>(166) | noop=>(170) |
| | noop=>(164) | error=>(152) | error=>(152) | error=>(152) |
| | noop=>(164) | error=>(152) | error=>(152) | error=>(152) |
| | error=>(152) | error=>(152) | error=>(152) | error=>(152) |
| | noop=>(164) | reset=>(164) | reset=>(164) | reset=>(164) |
| | | | | |
| | =>(142) | =>(142) | error=>(152) | error=>(152) |
| | error=>(152) | error=>(152) | =>(170) | error=>(152) |

TELECOMMUNICATIONS SYSTEM CRAFT INTERFACE DEVICE WITH BROADBAND END-TO-END CROSS-CONNECT CAPABILITY

BACKGROUND OF THE INVENTION

This invention relates to a craft interface device for executing maintenance and provisioning operations in a telecommunications system, This also invention relates to an associated method.

A Litespan™-type telecommunications system is a group of one or more Litespan™ terminals connected together, for example, in a chain configuration by optical fiber. Each Litespan™ terminal comprises a rack or other enclosure with multiple banks each having a printed circuit board "backplane." These printed circuit boards each have a plurality, e.g., sixty-five, of numerically ordered slots in which various cards, such as fiber cards and subscriber line cards, are vertically disposed.

Each Litespan™ terminal includes a common control (CC) bank and a number of subscriber banks (fiber banks, channel banks) for various kinds of fiber connections and various kinds of subscriber drops such as POTS, ISDN, HFC, etc. A fiber bank includes one backplane, power supplies, plug-in bank control units and fiber cards. A channel bank includes a single backplane, power supplies, plug-in bank control units and subscriber line cards. Each remote terminal (RT) access multiplexer communicates on one or both sides with a fiber span and may also include various types of subscriber drops. A local telephone company can begin operations with rack shelves only partially filled with backplanes and with the backplane slots only partially occupied and fill in the remaining backplanes and slots as the number of subscribers and service requirements increase.

In a Central Office (CO) of a telephone company, one terminal, called the Central Office Terminal (COT), has an interface to a digital cross-connect switch (DCS) and communicates with the chain of remote terminals (RT's) through one or two fiber spans. The remote terminals are typically located at geographically diverse locations in order to bring telecommunications service to different service areas.

Terminals can also include Broadband Fiber Banks (BFB's) which connect on one side to the terminal's common control and on another side to a number of distribution fibers. The distribution fibers connect to flrther optical network units (ONU's) such as a so-called "brick," a Broadband Remote Transceiver (BRX), or a VEX. These ONU's take fiber on one side and on the other side provide narrowband and broadband services over copper to a number of subscribers.

In order to perform maintenance and provisioning operations on the Litespan™ system, a craftsperson may use a Litecraft™ product, which is a PC-based product which can be plugged into a COT or RT. Upon connection of a Litecraft™ product to a system terminal, for example, via a serial port of the PC and a data link, the Litecraft™ product downloads configuration information from the system using a standard telephony communication language, TL-1, and presents the configuration information graphically to the user, beginning with a top-level diagram of the overall system. This top-level diagram shows a configuration of terminals and their operational relationships or connections to each other. When the user clicks on a component of the system, the Litecraft™ product retrieves information about that component and presents the retrieved information graphically to the user. This presentation is a number of levels deep, enabling the user first to see the overall system, then to see components in an individual terminal, then to see individual access mutiplexers within a terminal, then to see individual cards within an access multiplexer. Moreover, the user can open multiple windows and browse through the entire system independently in each such window.

In order to perform its various tasks, a Litecraft™ product must download extensive configuration information about the system to which it is connected. Such downloading is usually implemented via TL-1 across a serial communications link. The information is obtained from various terminals in the system.

When subscribers sign up for certain kinds of new broadband services, often one or more new permanent virtual paths (PVP's) or circuits need to be allocated within the Litespan™ system. One end of the path is at the subscriber's point of access to the system (e.g., on a line card in one of the access multiplexers or ONU's) and the other end of the path is either at a second subscriber's point of access to the system (if located within the system's local service area) or at the DCS (if not located within the system's local service area). The allocation of paths, which is known as "path hunting," involves the assignment of various telephony resources within the system including, but not limited to, a communication channel of sufficient capacity on the fiber chain. The assignment of such resources can be a relatively complicated task. For example, the Litespan™ system architecture requires that a communication channel to be assigned to the new path be the same channel assigned on all of the fiber segments in the path. In addition, it is desirable that communication channels remain available for assignment to a now path on other segments which do not overlap with those on which the channel is already assigned.

Conventionally, path hunting is performed manually by craftspeople. A craftsperson manually examines each end terminal and each intermediate terminal disposed along the path between the end terminals to find a single time slot or channel of a synchronous transport signal (STS), level 1 (STS-1), available at all terminals, In existing craft products, the Litespan™ terminals can perform path hunting automatically for narrowband and wideband services only.

OBJECTS OF THE INVENTION

An object of the present invention is to provide a craft interface device for performing maintenance and provisioning operations in a telecommunications network. More particularly, it is an object of the preset invention to provide a craft interface device wherein the establishment of a broadband end-to-end cross-connection is facilitated.

Another object of the present invention is to provide an associated method for establishing a broadband end-to-end cross-connection in a telecommunications network.

A more specific object of the present invention is to provide such a method which is user-friendly, i.e. easy to perform by a user.

These and other objects of the present invention will be apparent from the drawings and descriptions herein.

SUMMARY OF THE INVENTION

The present invention is directed to a craft interface device for accessing a telecommunications network having several levels or layers of interactive structure. The craft interface device performs maintenance and provisioning and related operations and comprises a graphical user interface for displaying on a monitor a sequence of graphical representations of operatively interconnected objects in a respective layer of the telecommunications network whereby a user can navigate graphically through the network from a highest hierarchical level of objects to a lowest hierarchical level of objects and operational interrelationships. The graphical user interface is operatively connected to a display interactive user input component (e.g., a mouse) for detecting user selection via the input component of a broadband first end point displayed in a first window by the graphical user interface and a broadband second end point displayed in a second window by the graphical user interface. Connection componentry is operatively connected to the graphical user interface and to the network for automatically establishing a broadband end-to-end cross-connection in the network in response to the user selection via the input component of the first end point and the second end point.

The graphical user interface is operatively connected to the display interactive input device or mouse for detecting an actuation of a button of the mouse when a mouse-controlled pointer on the monitor is at least partially disposed over either the first end point or the second end point.

In accordance with another feature of the present invention the connection componentry is operatively connected to the network via a data link for automatically discovering an available broadband telecommunications path in the telecommunications network between the first end point and the second end point and for automatically reserving the path. This discovery process is implemented by selecting a telecommunications time slot, for instance, an STS-1 slot, which would constitute the path, and automatically dispatching of inquiries over the data link to respective terminals of the network for purposes of determining whether the selected slot is available. Upon receiving affirmations as to slot availability from all terminations along the path from a first terminal including the first end point to a second terminal including the second end point, the connection componentry dispatches messages to the various involved terminals reserving the selected slot to thereby establish the broadband end-to-end cross-connection. Generally, the establishment of the path proceeds in segments: a first message is sent out reserving the selected path within the first end terminal, a second message or pair of messages is dispatched reserving the selected path along a segment between the first end terminal and the nest terminal, and so forth until the path within the second end terminal is reserved. Where there are intervening terminals along the path between the first end terminal and the second end terminal, the connection componentry sends inquiries to those terminals to determine whether the selected time slot is available for pass through. The establishing of the broadband end-to-end cross-connection is conditional upon finding a path or slot which is available for pass through at each of the intervening terminals.

The connection componentry thus includes means for identifying an available STS-1 time slot in an optical carrier at the first end terminal and in an optical cer at the second end terminal and further includes means for checking the intervening terminals, if any, for availability of the STS-1 time slot for pass through in the intervening terminals.

The present invention is also directed to a method for accessing a telecommunications network for purposes of maintenance and provisioning, where the network includes a plurality of levels or layers of interactive structure. The method comprises (1) displaying, on a monitor, a first browser window showing a graphical representation of broadband facilities at a first terminal of the telecommunications network. (2) detecting user selection via a display interactive input component of a broadband first end point displayed in the first browser window, (3) displaying, on the monitor, a second browser window showing a graphical representation of broadband facilities at a second terminal of the telecommunications network, (4) detecting user selection via the display interactive input component of a broadband second end point displayed in the second browser window, and (5) automatically establishing a broadband end-to-end cross-connection in the network in response to the user selection via the input component of the first end point and the second end point.

The establishing of the cross-connection generally includes automatically discovering an available broadband telecommunications path in the network between the first end point and the second end point and automatically reserving the path. More particularly, the establishing of the cross-connection includes automatically identifying an available STS-1 time slot in an optical carrier at the first terminal and in an optical carrier at the second terminal. Where the first terminal and the second terminal are connected to one another via an intervening terminal, the establishing of the cross-connection further includes automatically checking the other terminal for availability of the STS-1 time slot for pass through in the other terminal, and automatically reserving the STS-1 time slot in the first terminal, the second terminal and the other terminal.

BRIEF DESCRIPTION OF THE DRAWINGS

FIG. 1 is a block diagram of a telecommunications network.

FIG. 2 is a functional block diagram of a node or terminal in the telecommunications network of FIG. 1.

FIG. 3A is a block diagram of a fiber bank in a node or terminal as illustrated in FIG. 2.

FIG. 3B is a block diagram of a channel bank in a node or terminal as illustrated in FIG. 2.

FIG. 14 is a table of the different states of the object-oriented state machine and parser of FIGS. 4 and 5, indicating the various transitions among the different states.

DESCRIPTION OF THE PREFERRED EMBODIMENTS

Telecommunications System

Figure 4:
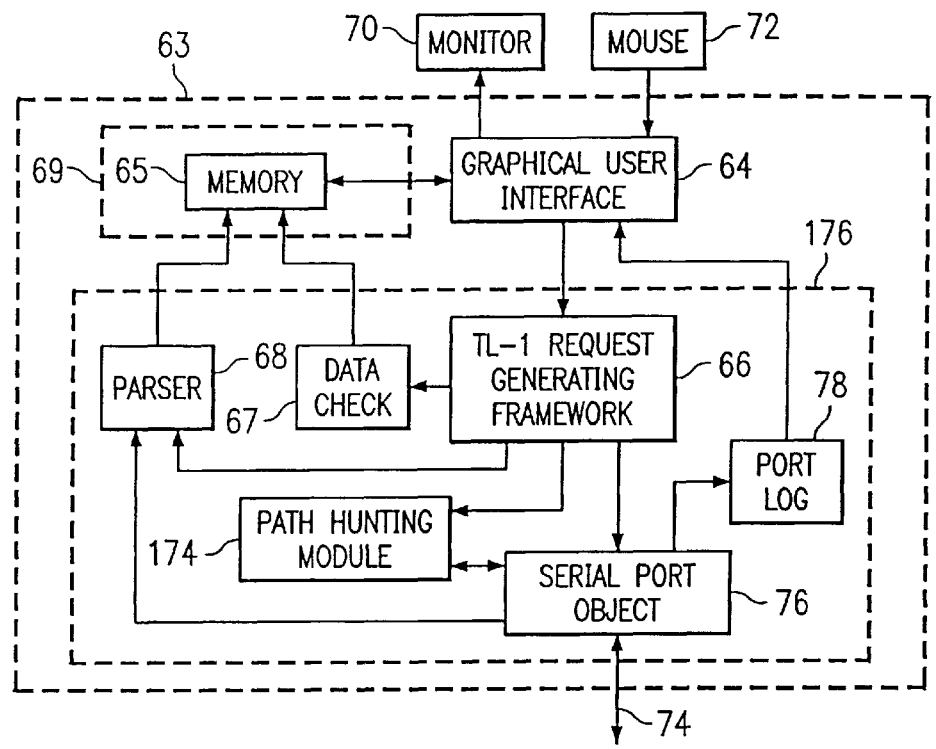
FIG. 4 is a block diagram of a craft interface device for performing maintenance and provisioning operations for the telecommunications network of FIG. 1.

As illustrated in FIG. 1, a Litespan™-type telecommunications system or network includes several Litespan™ nodes or terminals 12 connected together in a chain configuration by optical fiber telecommunications links 14. One terminal 16, called the Central Office Terminal (COT), is located in a Central Office (CO) 18 of a telephone company and communicates on one side with a digital cross-connect switch (DCS) 20 and on another side with the chain of remote terminals (RT's) 22, 24, 26. The remote terminals 22, 24, 26 are typically located at geographically diverse locations in order to bring telecommunications service to different service areas. The digital cross-connect switch 20 links the central office terminal 18 to other networks.

As depicted in the functional diagram of FIG. 2, each Litespan™ terminal 12 has a common control (CC) bank 28 and access multiplexers including fiber banks 30 for various kinds of fiber connections and channel banks 32 for various kinds of subscriber drops such as POTS, IS ISDN, HFC. Channel banks 32 are connected via copper wire 34 to subscribers 36. Terminals 12 can also include Broadband Fiber Banks (BFB's) 38 which connect on one side to optical fiber chain 14 and on another side to a number of distribution fibers 40. Channel banks 32, High-Density Fiber banks (not illustrated), and Broadband Fiber Banks 38 are all instances of subscriber bank assemblies.

Distribution fibers 40 connect to further optical network units (ONU's) 42 such as a so-called "brick," a Broadband Remote Transceiver (BRX), or a VEX, These ONU's 42 take fiber 40 on one side and on the other side provide narrowband and broadband services over copper wires 44 to a number of subscribers 46.

FIG. 3A shows components of a fiber bank 30, including a printed circuit board or "backplane" 48, power supplies 50, plug-in bank control units 52 and fiber cards 54. FIG. 3B shows components of a channel bank 32, including a single backplane 56, power supplies 58, plug-in bank control units 60 and subscriber line cards 62.

Terminals 12 are each implemented by a rack (not shown) having multiple shelves each with a few rows of printed circuit boards or "backplanes" 48 and 56. Printed circuit boards or backplanes 48 and 56 each have a plurality, e.g., sixty-five, of numerically ordered slots (not shown) in which various cards, such as fiber cards 54 (FIG. 3A) and subscriber line cards 62 (FIG. ffl 3B), are vertically disposed.

Craft Interface Device

In order to perform maintenance and provisioning and related operations on the Litespan™ system or telecommunications network (FIG. 1), a craftsperson may use a Litecraf™ product, a PC-based craft interface product 63 (FIG. 4) programmed with the Smalltalk object-oriented language, which can be plugged into a terminal 12. The Litecraft™ maintenance and provisioning device 63 consists of three major subsystems shown diagrammatically in FIG. 4, namely, (1) a system or framework 176 for communicating with the Litespan™ system, (2) a domain modeling framework 69 representing the internal structure of a Litespan™ database, and (3) an application model or graphical user interface 64 which guides the user through Litecraft™ operations. Generally, the Litecraft™ maintenance and provisioning device communicates with a Litespan™ system or telecommunications network using the serial port of its host computer. This is the case regardless of whether a data link is established via a Litespan™ craft port, dialup connections via modem, or connections through an X.25 network.

As illustrated in FIG. 4, Litecraft™-type PC-based craft device 63 for performing maintenance and provisioning and related operations for a telecommunications network as described above with reference to FIGS. 1–3B comprises graphical user interface 64, a request generating and processing framework 66 of functional groupings, and a parser 68. Graphical user interface 64 is operatively connected to a monitor 70 for displaying thereon structural components of the telecommunications network and for indicating, on the monitor, operating relationships among the structural components. More generally, graphical user interface 64 dislpays on monitor 70 graphical representations or icons of various interconnected network objects including software objects, database records, and physical and logical objects within the telecommunications network. Graphical user interface 64 also detects user commands executed, for example, via a display interactive input device 72 such as a mouse and/or keyboard.

In response to user commands detected by graphical user interface 64, framework 66 generates TL-1 commands (data requests) to be transmitted over a data link 74 to the network and for reading characters arriving from the network. Parser 68 is operatively coupled to framework 66 for parsing information from an incoming sequence of data lines or events. Parser 68 provides this information to graphical user interface 64 for display thereby on monitor 70.

This information may be processed first by framework 66, before supplying it-to graphical user interface 64.

In accordance with the principles of object-oriented programming, framework 66 includes or is operatively connected to a software-implemented serial port object 76. The application code which uses this object does so by sending it messages to write a single character, write a line of characters, or read a (CR- or LF-terminated) line of characters. As it performs these services, port object 76 sends notifications to a "port log" 78 which is responsible for displaying and/or logging a stream of TL-1, a standard telephony communication language.

Domain Model Building

As illustrated in FIG. 4, craft interface device 63 includes an object-oriented memory 65 operatively connected to graphical user interface 64 and particularly to functional display and input detection modules thereof (not illustrated). Memory 65 contains, during at least some stage of a network accessing session, a plurality of model objects corresponding to respective physical objects of the network in different layers thereof. The domain model objects have data slots or spaces populated with information pertaining to the internal structural components of selected parts of the telecommunications network. (Graphical analogs of some of these model objects are shown in FIGS. 6–9.) Memory 65 also stores names for the domain model objects, those names being the same as the names of the corresponding physical objects of the telecommunications network. Memory 65 is part of domain modeling framework 69 whose function is to represent the internal structure of a Litespan™ database.

Framework 66 and parser 68 are part of communications framework 176 which operates in part as a domain model builder operatively connected to graphical user interface 64 and to framework 69 for selectively building a domain model of the network in memory 65 in response to user requests for graphical displays of internal structures of physical network objects selected by the user. This domain model builder is operatively connected to memory 65 for creating and populating model objects in the memory in response to the user requests.

Craft interface device 63, particularly request generating and processing framework 66, may also comprise a data check 67 (FIG. 16) operatively connected to memory 65 to determine, after detection of a user request and prior to transmission of a request over serial object port 76, whether memory 65 is free of adequate information pertaining to an internal structure requested by the user.

Parser

Figure 5:
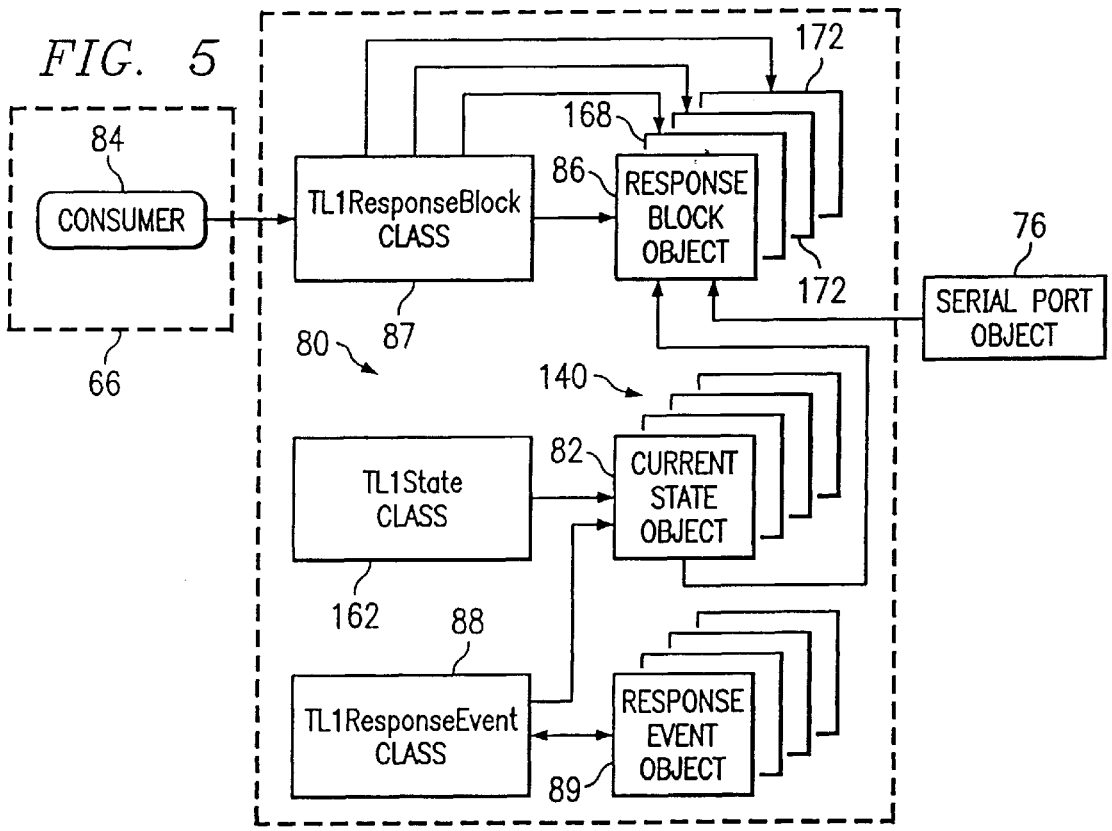
FIG. 5 is an object block diagram of a parser shown in FIG. 4.
Figure 5A:
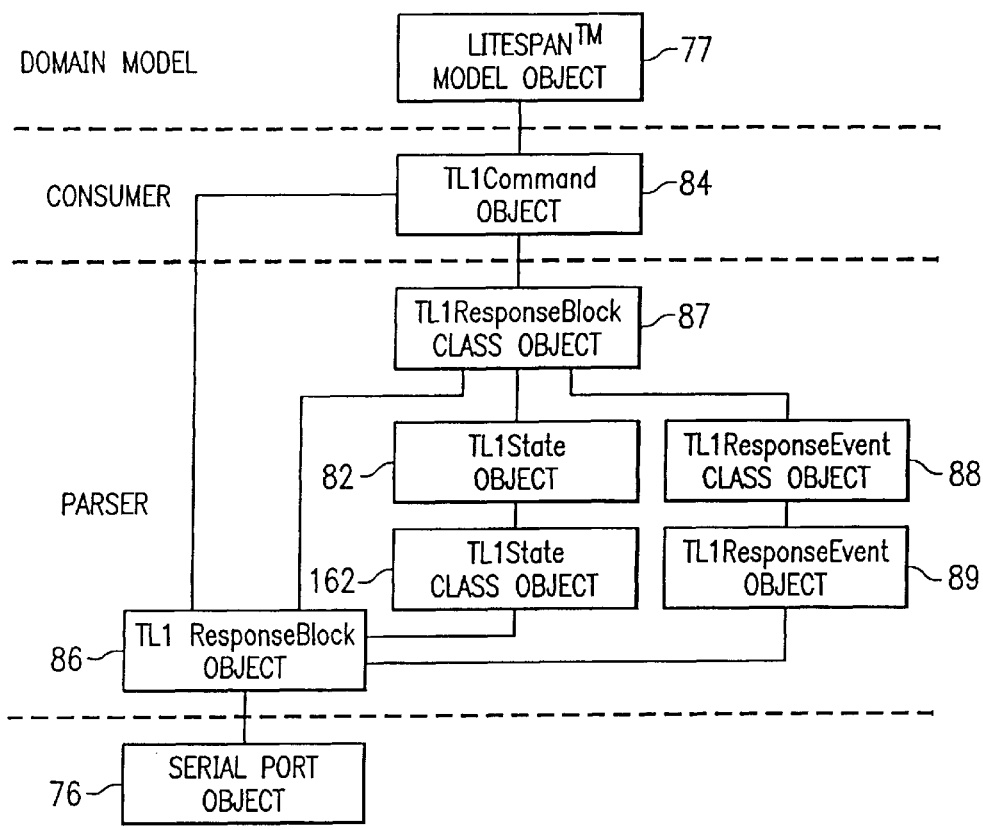
FIG. 5A is an object association diagram showing the relationships among objects of the parser of FIGS. 4 and 5.

FIGS. 5 and 5A show the functionality of parser 68, Parser 68 is implemented in object-oriented programming by respective class objects and by other objects which are instances of the main classes or subclasses thereof. More specifically, parser 68 includes an object-oriented finite state machine 80, whose state is that of a current state object 82 taken from a group of different possible state objects 140 (see also FIGS. 10 and 12–14). The state of state machine 80 at any one time can change to any one of generally a plurality of predetermined states, depending on the class of the current state and on the type of an incoming message. State objects 140 are instances of subclasses of a top-ranked hierarchical class 162, called TL1State (see FIG. 12).

Parser 68 also includes a response block class object 87, Response block class object 87 is the object controlling the operation of state machine 80. Parser 68 further comprises a TL1ResponseEvent class object 88 defining the set of possible response events.

Response block 86 is generated upon the invoking of parser 68, particularly TL1ResponseBlock class object 87, by a consumer 84. Consumer 84 is generally a TL-1 command or data request and a part of framework 66 which generates requests for information about the telecommunications network (FIG. 1). (Request generating and processing framework 66 is pan of communications framework 1 76, which includes parser 68, a collection of TL-1 commands, related functions and response block 86, and which processes user requests detected via graphical user interface 64.) Response block 86 controls parsing of an incoming data block or series of data blocks constituting a response to a TL-1 command or data request. Response block 86 is the interface, the only point of contact, between consumer or TL-1 command 84 and parser 68. Response block 86 holds a reference to the current state of state machine 80, TL1ResponseEvent class 88 generates symbols that represent event types, in response to incoming ASCII data lines.

Each line, which is a part of a known TL-1 "response" or a TL-1 autonomous notification, corresponds to an event in the state machine 80, The event type of a given line is determined by examining the contents of the line in various ways.

A TL1ResponseBlock object retrieves a line or event of an incoming data block. TL1ResponsEvent object 88 (on the class side) categorizes the line and generates a response event object 89 that contains a symbol that represents the category (event type). The TL1ResponseBlock class object 87 sends the information as a parameter to the current state object 82 via the current TL1ResponseBlock object 86. This parameter, TL1ResponseEvent object 88 represents an event type. The current state object 82 responds to this message in a way which depends on the class of the current state object and the type of the event.

Generally, the response of the current state object 82 includes the extraction of information from the text line which generated the event. The current state object populates the response block object 86 with this information. The response of the current state object 82 may also include replacing itself with a different current state object, possibly of a different class or subclass of TL1 State 162. In this way, parser 68 builds up a complete record of a single TL-1 response.

FIG. 5A is an object association diagram illustrating relationships among the various objects that collaborate to retrieve, parse, and deliver data to graphical user interface 64. The lines between the object signify associations including collaboration, instantiation, and containment. The diagram of FIG. 5A is divided into architectural layers, one of which is the parser 68. From this point of view, parser 68 is a collection of collaborating objects that retrieves, validates and assigns meaning to TL-1 data from serial port 76 and delivers this information via the consumer or TL-1 command object 84 to the graphical user interface domain model and particularly to a domain model object 77 thereof.

Each time framework 66 sends a TL-1 request to the telecommunications network (FIG. 1) over data link 74, that request is represented by a respective command object. This command object is primarily responsible for generating its command string and interpreting the response data. Each type of command object in craft interface device 63 is represented by a subclass of TL1Command (a class object identifying the class).

In most cases, the client of a TL-1 request is interested in the result attribute of the request. If the request is for a simple action, the result should indicate whether of not the action was successful. If the request is a request for data, the result will typically be a collection of model objects of the telecommunications network.

TL-1 processing in framework 66 is typically routed through a model object. This object may receive a message asking the object to retrieve a certain set of domain model objects from the telecommunications network. The model object then creates a command object appropriate to the retrieval type, configures the command with any required parameters, processes the command and answers its result.

Figure 6:
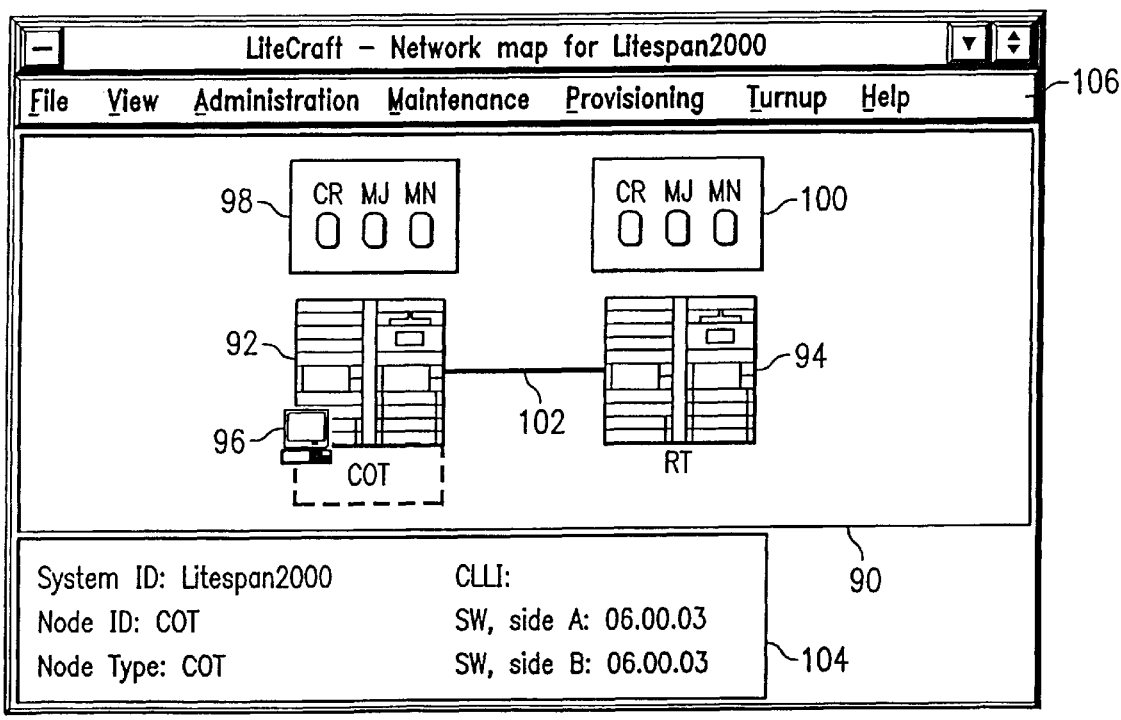
FIG. 6 shows an initial screen or window displayed by a craft interface device in accordance with the present invention upon log-in or connection to a telecommunications network.

Upon connection of craft interface device 63 to a terminal 12 of the telecommunications network, the craft interface device downloads configuration information from the network using TL-1 and presents the configuration information graphically to the user via a window on monitor 70 (FIG. 4), beginning with a top-level diagram of the overall system, shown in FIG. 6. The configuration information is stored in memory 65 of craft interface device 63 as a set of domain model objects. The set of objects of the domain model represents the contents of one or more network databases and is constructed piecemeal, with only so much information being retrieved from the telecommunications network as is necessary to present a desired display to the user.

Figure 9:
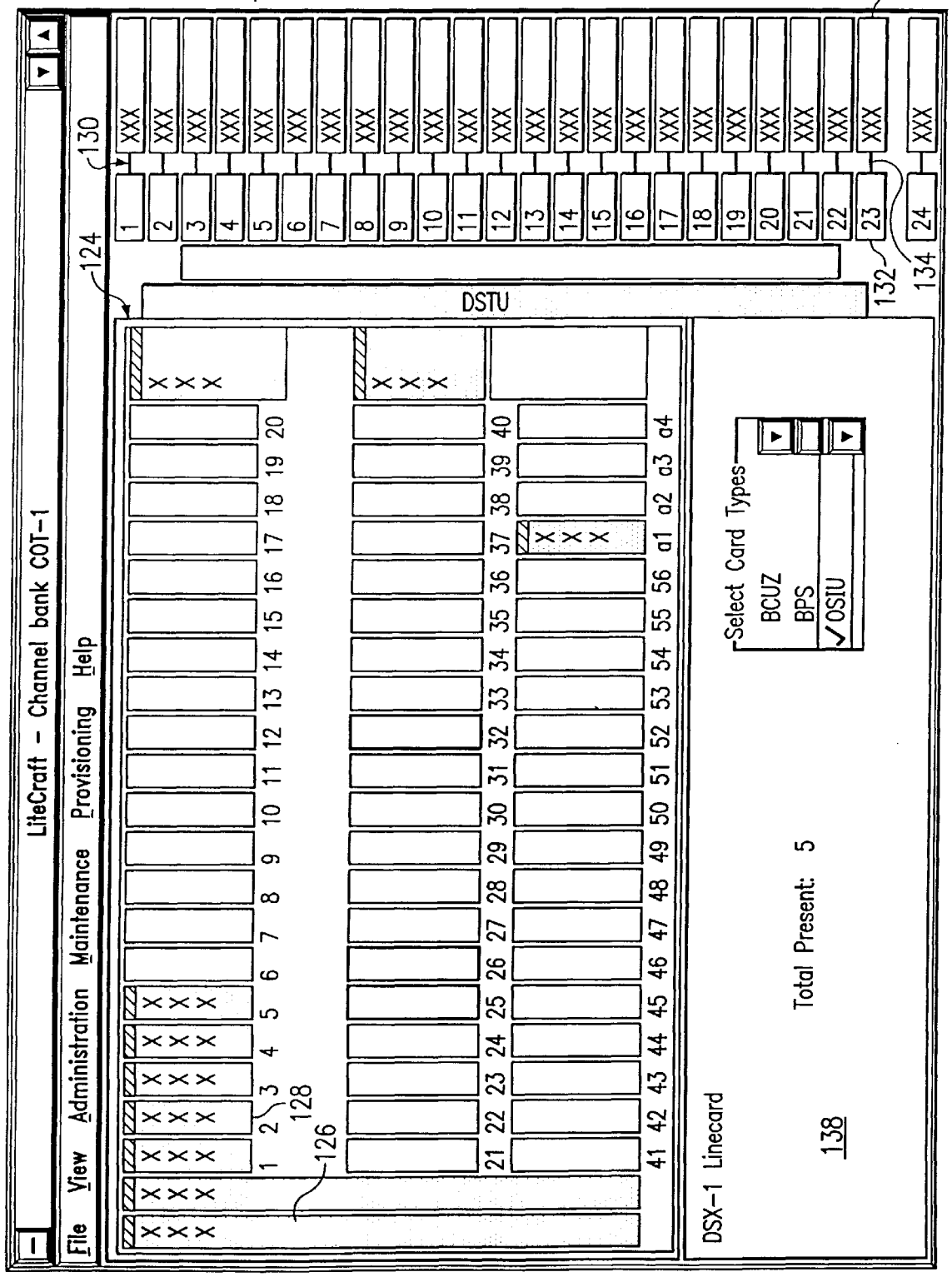
FIG. 9 shows a screen or window displayed by a craft interface device in accordance with the present invention in response to a user's mouse click on an icon representation of a channel bank in FIG. 7.
Figure 10B:
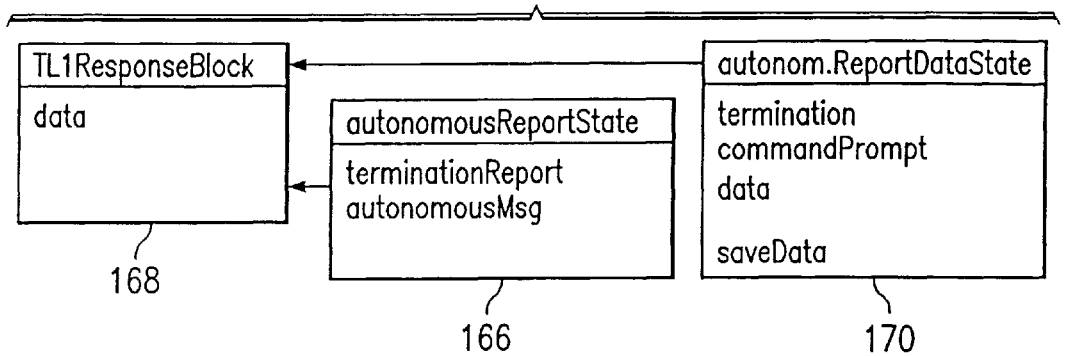
FIG. 10 is a diagram showing possible states of an object-oriented state machine included in the parser of FIGS. 4 and 5.

When the user operates mouse 72 (FIG. 4) and clicks on a component of the system, craft interface device 63 retrieves information about that component from the network and presents the retrieved information to the user as another graphic representation or display in the same window. The presentation of the telecommunications network to the user is thus a number of levels deep, enabling the user first to see the overall system (FIG. 6), then to see components in an individual terminal (FIG. 7), then to see individual access multiplexers (FIG. 9) within a terminal then to see individual cards within an access multiplexer (FIG. 10). Moreover, the user can open multiple windows and browse through the entire system independently in each such window.

During the log-in procedure, a minimal set of information is retrieved from the telecommunications network to bootstrap the domain model. This minimal set of information includes the network map (FIG. 6), as well as the current software version and possibly alarm summary information, and is obtained from the connected telecommunications node or terminal 12. For each node or terminal 12 (FIG. 1) in the telecommunications network, a domain model object is created in craft interface device 63 to represent the node in the model. The class instantiated to represent each node of terminal 12 depends on the type of system and the software version on the terminal control processor. In the object-oriented programming of craft interface device 63, the hierarchy of these type/version specific classes may be found under the principal class for nodes.

The domain model of the telecommunications network, located in memory 65 of craft interface device 63, assembles itself in response to external queries about its state, This piecemeal construction of the domain model may be termed "Lazy Retrieval" and follows a pattern established by so-called "lazy initialization," which is a common practice in object-oriented programming According to this Lazy Retrieval technique, memory 65 (FIG. 4) contains populated model objects corresponding only to physical objects of the network for which the user has requested a graphical display of internal structural components.

Display Screens showing Different Levels of Telecommunications System

As illustrated in FIG. 6, a top-level screen display initially appearing upon link-up of the craft interface device of FIG. 4 to the telecommunications network of FIG. 1 shows, in an equipment pane 90 of the screen display, a first icon 92 corresponding to the central office terminal or COT 16. Only one remote terminal or RT 22 is represented in equipment pane 90 for purposes of simplicity. In actuality, all remote terminals 22, 24, 26 connected in the communications network are represented by respective icons in equipment pane 90 on start-up. A PC icon 96 is shown overlapping the COT icon 92 to indicate that the craft interface device 63 (FIG. 4) is connected to the telecommunications network at the COT. In the equipment pane are also shown alarm summary displays 98 and 100 for each graphically represented terminal 16, 22 (FIG. 1), above the respective icons 92 and 94. The alarm summary displays 98 and 100 indicate the type and associated number of alarms. Alarm boxes CR, MJ and MN are filled in with respective colors if there are more than one critical (CR) alarm, more than one major (MD) alarm, or more than one minor (MN) alarm, respectively. If there are no alarms, the alarm boxes CR, MJ, and MN are white or noncolored. An operational relationship between successive nodes or terminals 12 and 22 is indicated on equipment pane 90 by a line 102 between icons 92 and 94. The color of line 102 is varied to represent whether the remote terminal 22 (FIG. 1) is communicating with the connected, COT node 16, whether the data link is provisioned but not communicating, whether there is no record for the data link retrieved from the connected node, or whether an abnormal condition exists.

The top-level screen display illustrated in FIG. 6 also has a detail pane 104. Upon a use of mouse 74 (FIG. 4) to click on a node icon 92 or 94 and upon a selection of "Show Node Summary" from a "View" menu choice on a menu bar 106, detail pane 104 sets forth particulars about a respective selected node 16 or 22. If the user clinks on line 102 and then chooses "Data Link Status" from a "Provisioning" menu choice on bar menu 106, detail pane 104 sets forth particulars about the data link.

The View menu choice on menu bar 106 generally enables a user to view selected windows, retrieve the contents of a current window, and view detailed and summary information. In particular, if the user mouse clicks on a node icon 92 or 94 and then chooses a "Zoom In" selection from the View menu, graphical user interface (GUI) 64 (FIG. 4) of craft interface device 63 operates to provide on monitor 70 another graphical representation or display (FIG. 7) showing internal structural components of the selected node or terminal. As discussed above, these structural components are absent from the memory of the craft interface device 63 at the instant the user makes the selection. This information is now retrieved from a network database, in particular from the selected node or terminal. A clicking via mouse 74 on a node icon 92 or 94 results in a message being sent to a model object in memory corresponding to the selected node or terminal. The message asks for state information and includes a request for objects "contained by" the model object receiving the message. The model object checks its own state to determine whether the requested objects have already been retrieved (during the same network access session, the user might return to the network map display). If the model objects have already been retrieved from the network, the model object answers the "cached" objects. If the requested objects, corresponding to respective structural components of the selected node or terminal have not been retrieved, then the model object retrieves them, "installs" them into the domain model and answers them.

The "Lazy Retrieval" of model objects from the network is frequently initiated when a GraphicComposite object is setting up a map between the domain model objects and respective display regions. During this process, the composite object traverses the domain model, requesting the objects the composite needs to display. If these objects have not already been "cached," they will be retrieved at that time and then supplied to the requester.

Additional lay retrievals may also occur when model objects are displaying themselves. In these cases, a model object may send itself a message asking for a visible property, e.g., color. If the value of this visible property depends on some not-yet retrieved object, a lazy retrieval of the required object is initiated.

Figure 7:
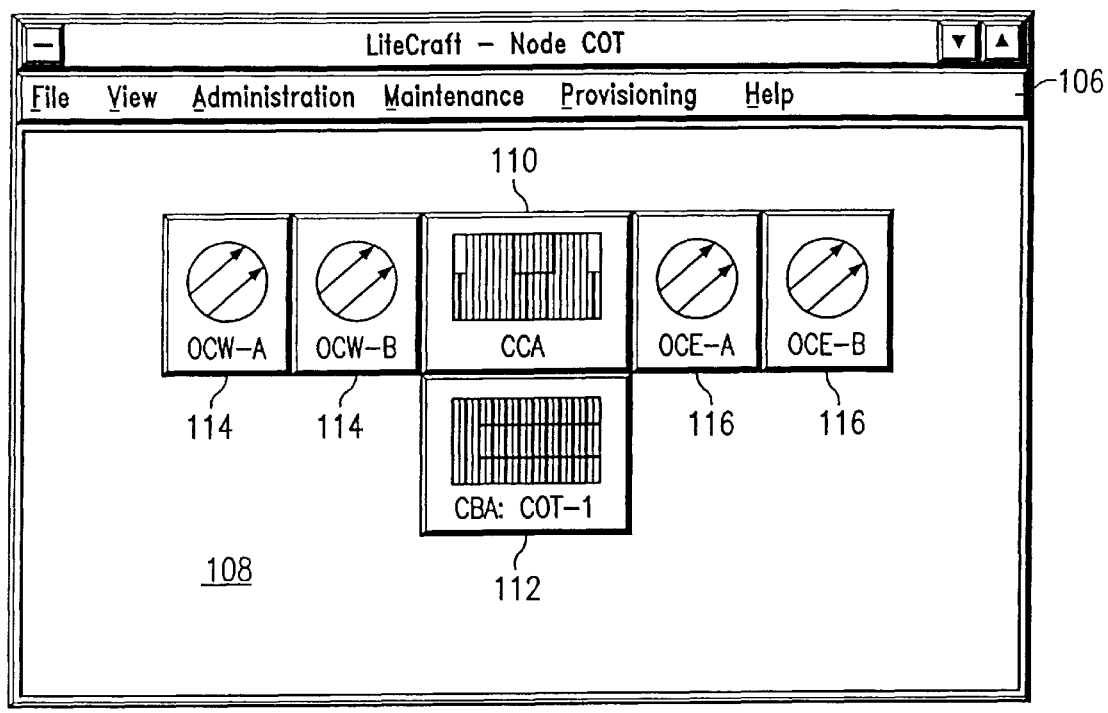
FIG. 7 shows a screen or window displayed by a craft interface device in accordance with the present invention in response to a user's mouse click on an icon representation of a network node or terminal in FIG. 6.

FIG. 7 shows a screen display on monitor 70 by graphical user interface 64 (FIG. 4) in response to a clicking via mouse 74 on a node icon 92 or 94. This new screen display includes an equipment and facilities pane 108 showing graphic representations of internal structural components of the selected node or terminal. The graphic representations include a common control assembly icon 110, a channel bank assembly icon or block 112, and icons for SONET optical carrier facilities west (OCW) 114 and east (OCE) 116. These icons are graphic representations or symbols of actual structural or physical components of the selected mode or terminal. For example, icon 10 corresponds to common control bank 28 in FIG. 2, while icon or block 112 corresponds to a channel bank 32 (only one shown in FIG. 7 for simplicity purposes). Again, structural elements of any one of these components may be accessed in a new display by mouse clicking on the respective icon or graphical representation and then choosing a "Zoom In" selection from the View menu choice of menu bar 106.

Figure 8:
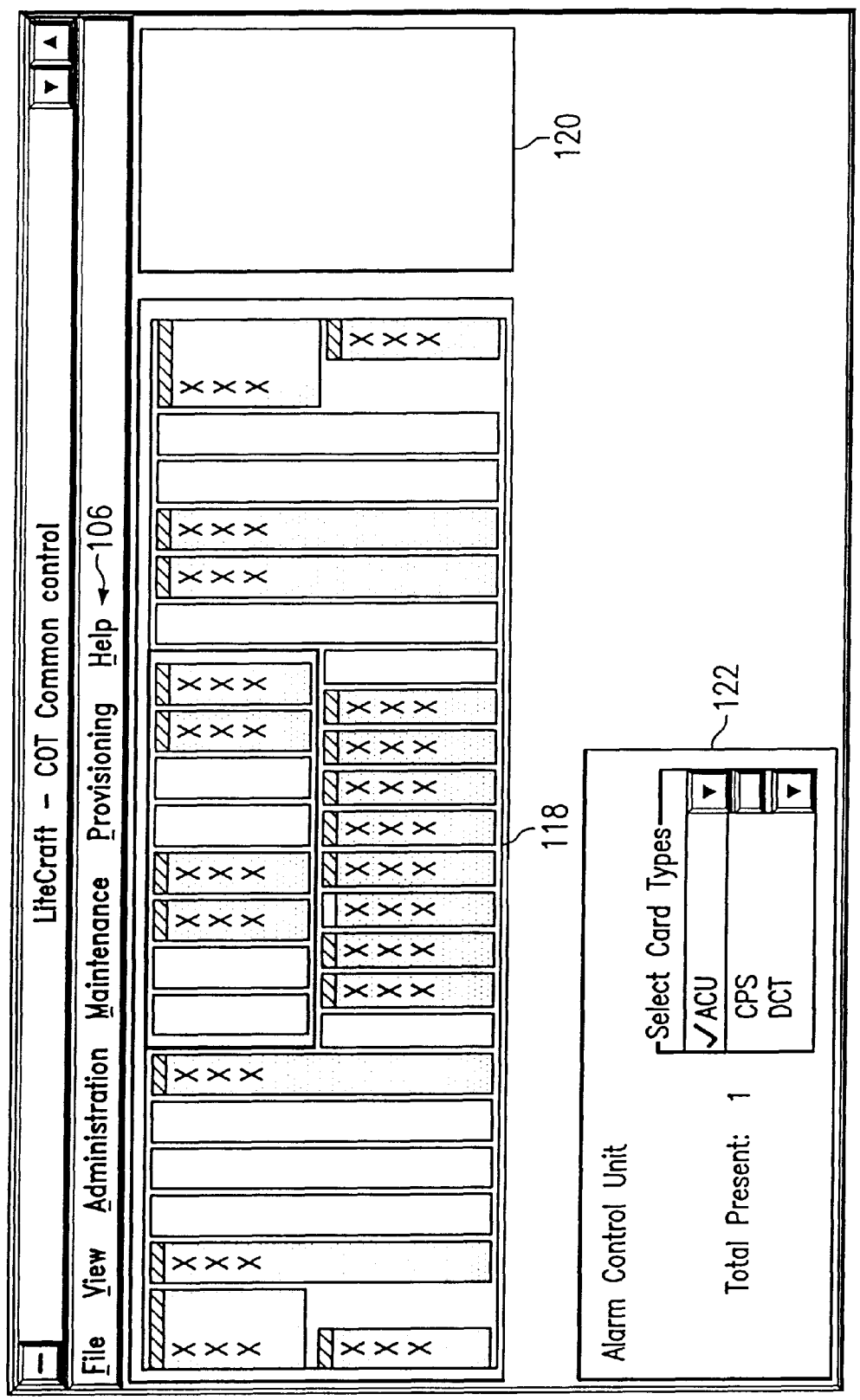
FIG. 8 shows a screen or window displayed by a craft interface device in accordance with the present invention in response to a user's mouse click on an icon representation of a command and control bank in FIG. 7.

Representative substructures of Common Control Assembly (CCA) are depicted in FIG. 8. The CCA display or window includes an equipment pane II 8 which shows graphical representations or blocks corresponding to assigned equipment retrieved from the common control bank 28 (FIG. 2) or broadband shelves, The CCA screen display further includes a facilities pane 120 which shows subscriber facilities when a broadband interface card is selected. If a card with no facilities is selected or if multiple cards are selected, then facilities pane 120 will be blank, The CCA screen display also includes a detail pane 122 which shows detailed information about the system configuration. FIG. 9 shows a display on monitor 70 provided by graphical user interface 64 in response to a clicking via mouse 74 on the channel bank assembly block or icon 112. An equipment pane 124 shows, in graphical form, assigned and/or equipped equipment retrieved from the selected channel bank assembly 32. Equipment pane 124 specifically includes two control unit icons or blocks 126 and subscriber line card icons 128 arranged in three rows as the actual subscriber line cards are disposed in respective shelves of a terminal rack.

The channel bank screen display of FIG. 9 also includes a facilities pane 130 showing, in iconographical form, the facility or facilities assigned to a selected card. If a card with no facilities is selected, or if multiple cards are selected, then facilities pane 130 is blank If a graphically represented facility 132 on a selected line card is cross-connected, facility pane 130 shows a horizontal line 134 between that facility and the respective cross-connected far-end facility 136. If the far-end facility 136 can be reached through a data link, then its access ID is also shown.

The channel bank screen display of FIG. 9 also includes a detail pane 138 showing F-=particulars about equipment and subscriber facilities. To view the detail pane, the user selects "Plug-In Equipment Summary" from the View menu.

TL-1 Response Processing

Each time a user first clicks on a structural icon during a network accessing session, for example, in the network map display of FIG. 1, the node display of FIG. 7, the Common Control Assembly display of FIG. 8, or the channel bank display of Fig, 9, framework 66 (FIG. 5) sends a TL-1 command or request to the telecommunications network (FIG. 1) over data link 74 to obtain the domain model object information pertaining to the internal structural elements of the selected component. This TL-1 command or request has a counterpart in consumer 84. A primary response block object 86 (FIG. 5) is generated in response to the passing of a message by consumer 84 to TL1ResponseBlock class object 87. Response block object 86 receives and holds the information arriving from the network in response to the transmitted TL-1 command or request. TL1ResponseBlock class object 87 is the controlling object in parsing a TL-1 data block carrying part of all of the requested information. Response block object 86 contains a reference, parserstate, to current state object 82 and a reference, data, to a block of TL-1 data stream. The function of the data reference is to return the next line of TL-1 data until all lines of the data block have been processed. Certain elements have been identified from a TL-1 data stream and preserved in instance variables of collections for further reference.

Each line of an incoming data block is looked at by the TL-1 response event object 88 (FIG. 5)) which determines whether the line is legal in the TL-1 telephony language. This response event object encapsulates rules for what a proper token or line is in TL-1. Once a fine of a data block is determined to be proper, it is passed onto current state object 82 which extracts the data.

TL-1 commands are produced by a series of user inputs that validate and translate to TL-1 request messages. TL-1 data blocks are messages that appear in direct response to a TL-1 request transmitted by framework 66 over data link 74. Generally, a response to a TL-1 request will arrive before a new TL-1 request is transmitted. However, that is not necessarily the case. There will be, however, a one-to-one correspondence between transmitted TL-1 requests and responses received in response to the requests. A ctag identifier will connect a transmitted TL-1 is request and the TL-1 data block or blocks received in response to that request. Thus, one TL-1 response may span across several TL-1 data blocks which will all be linked together by one ctag.

All TL-1 data blocks each contain a Header, a Termination Report, Data and a Completion Comment. The response data may deviate a little depending on the type of request. The Termination Report status supplies information about the combination of valid data and errored data that will follow. The following are samples of three different combination of TL-1 responses depending an the type of termination report received.

DENY

There is a single error code indicating a global failure for the entire input command or there is a set of error codes specific to individual access identifications.

DENY

There is a single error code indicating a global failure for the entire input command or there is a set of error codes specific to individual access identifications.

| Example 1 | Example 2 |
|---|---|
| ᴧᴧᴧLitespan2000 93-09-29 | ᴧᴧᴧLitespan2000 93-09-29 |
| 14:43:23 | 14:43:23 |
| ᴧᴧᴧM O DENY | M O DENY |
| ᴧᴧᴧSNVS | ᴧᴧᴧMERR (Multiple Error) |
| ᴧᴧᴧ"COT-1-2::" | ᴧᴧᴧ"RT::ERCDE=SSTP" |
| ᴧᴧᴧ/* Card Slot.....*/ | ᴧᴧᴧ/*Far Terminal */ |
| ᴧᴧᴧ/* 0 T1 Edited */ | ᴧᴧᴧ"RT::ERCDE=SSTP" |
| ; | ᴧᴧᴧ/* Far Terminal */ |
|  | ᴧᴧᴧ/* 0 T1 Edited */ |
|  | ; |

PRTL

Some of the equipment was edited, entered, deleted or rtrieved as requested. There are error codes specific to individual access identifications that failed.

∿∿∿Litespan2000 93-09-29 1443:23
M 44 PRTL
∿∿∿"COT-1-1:DS1U, DS1U . . . "
∿∿∿"RT; ERCDE=SSTP"
∿∿∿/*Far Terminal Communication Problem */
∿∿∿RT5-1-1:DS1U, DS1U . . . "
∿∿∿/* 4 Eqpt Retrieved */
COMPLD
The equipment was changed or retrieved as requested.
∿∿∿Litespan2000 93-09-29 14:43:23
M 1 COMPLD
∿∿∿"COT-1-1:DS1U, DS1U . . . "
∿∿∿/* 1 T1 Facilities Retrieved */
;

As discussed above, TL-1 response event object 88 (FIG. 5) takes a TL-1 string, analyzes it and returns an event. The valid events are listed in the table of FIG. 14 and shown along state transitions in the state diagram of FIG. 13, with the number sign (#) inserted as a leading character to identify the events as such. These events include the following:

header
The header identifies the telecommunications system, for example, as a Litespan™ system containing Litespan™ terminals, The header contains the node name, date and time information. Analysis of this line or string seeks three blanks plus alphanumeric characters to predict the header.

*terminationReport
The termination report contains the ctag which is used to tie a TU-1 request to the respective response. Analysis seeks the character "M" in the first position of the string being analyzed.

termination
The termination character is used to predict the end of TL-1 data for a TL-1 request. Analysis seeks the character ";" in the first position of the string being analyzed.

blockContinuation
The block continuation is used to signal that data will continue on into the next data block from the Litespan™ system. Analysis seeks the character in the first position of the string being analyzed.

commandPrompt
The command prompt echoes the TL-1 command sent to the Litespan™ system. Analysis seeks the character "<" in the first position of the string being analyzed followed by the TL-1 command.

errorcode
The error code indicates a global failure for the entire input command from the Litespan™ system. If "MERR" is present as the error code, then multiple messages will follow. The message will comprise the error code followed by data to identify the equipment in default then a comment to give information on the faulting equipment. Analysis seeks three blanks plus four characters to predict the error code. The four characters cannot contain a quote.

data
The data identifies the Litespan™ equipment data information. Analysis seeks three blanks plus a quote followed by a data string.

errorData
The error data identifies equipment which has faulted. This type of error data is present when the data block contains good data and errored data. This would be present in a PTRL termination report type data block. Analysis see ks three blanks plus a quote mark followed by a string that contains the expression 'ERCDE='.

comment
The comment identifies faulting equipment or gives information about the completion of a command. Analysis seeks three blanks plus a front slash mark (/).

crc
This is a comment that contains an ASCII character string representing a CCITT CRC 16-bit checksum calculated on the data block buffer at the connected Litespan™ terminal. Analysis seeks three blanks plus a front slash mark (/) followed by the character string "CRC-".

inProgress
Some TL-1 commands are delegated to a background process in the Litespan™ network. This allows other TL-1 commands to be processed while the backgound process completes the action specified by the command. The initial response for this type of command is a line containing the character string "IP" followed by a command prompt. When the background process completes, the full response to the command appears as an autonomous report in the TL-1 response stream. Analysis seeks three blanks plus the character string "IP".

dataContinuation
Data continuation is the same as data but is the result of data being continued on the following line because of the length of the data. Analysis seeks the mark "<" and three blanks.

autonomousMsq
The Litespan™ network may generate autonomous messages that report the status of equipment, alarms, conditions or other network entities or events. These messages are not invoked by a TL-1 command, but are generated spontaneously by network elements. Analysis seeks a single space followed by either the character string "REPT" or the character string "CANC".

commandstring
The Litespan™ network echoes all commands that it receives directly back to the sender. This is designed to allow a user to interact with a dumb Litespan™ terminal. The Litecraft™ parser must compensate for this command echo by detecting it, moving to the correct state and refraining from passing the echo back to the consumer as though it were a A response. Analysis seeks a tenrination character ";" in the response line.

blankline
Blank lines are lines that do not matter such as ^C, blank line, and crlf combinations.

unidentifiedLine
Any string that does not fit into one of the above cases is considered unidentified.

State Machine

FIG. 10 shows a set or collection of possible state objects 140 of the object-oriented state machine 80 (FIG. 5). Each state object shown in FIG. 10 may become the current state object of the machine. The identity of the current state object 82 is encoded in the reference parserState held by response block object 86. Set or collection 140 includes a command echo state object 141, a header state object 142, a termination report object 144, a termination object 146, an error comment object 148, an error data state object 150, an event error state object 152, a data state object 154, a continuation data state object 156, a data comment state object 158 and a final state object 160, a prompt sync state object 164. an autonomous report state object 166, and an autonomous report data state object 170. Generally, these possible state objects find a rough correspondence to the valid TL-1 response events listed above.

Command echo state object 141 is an initial object in a TL-1 request processing procedure. This state awaits the echo back of the command or request which initiates the procedure.

Figure 11:
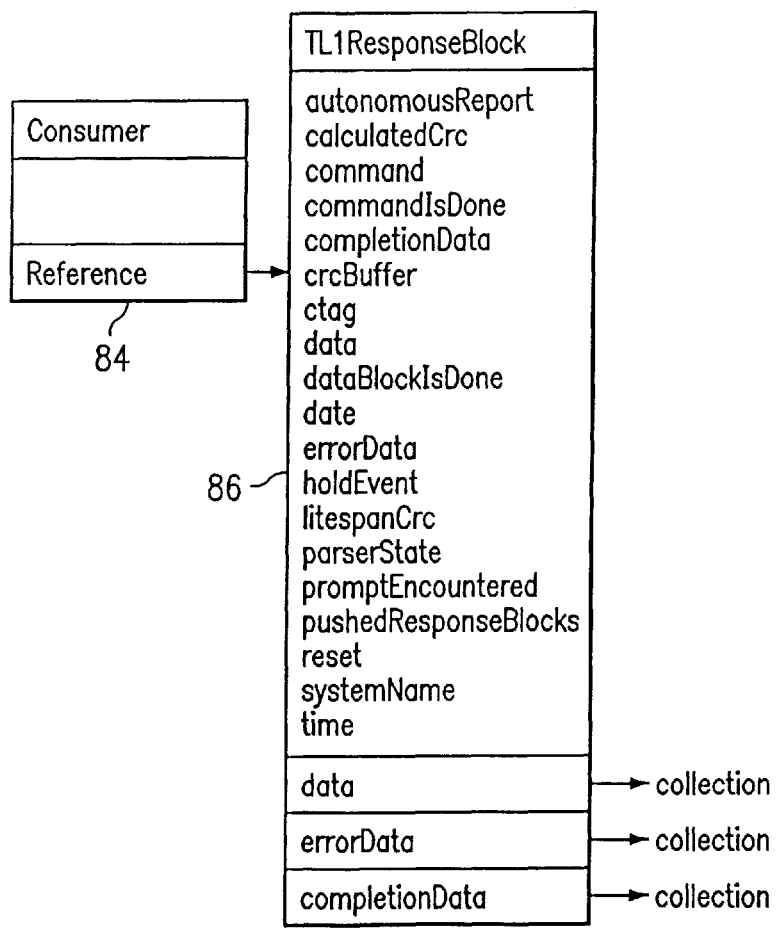
FIG. 11 is representation of a response block object contained in the parser of FIGS. 4, 5, and 10. showing types of data block information held by the response block object in respective buffers during a parsing operation.

FIGS. 10 and 11 show the response block object 86. This object collects all information contained in an incoming TL-1 response, whether a single or multiple TL-1 data blocks, and holds that information in various buffers for future use. As indicated in FIG. 10 by arrows extending from various state objects 140 to response block object 86, the various buffers of the response block object are filled as a result of action by different state objects. Where the information is delivered to craft interface device 63 pursuant to a TL-1 request, the completely filled or populated response block object and accordingly the information contained therein are delivered to a client request in an applications program, generally graphical user interface 64. The information preserved in response block object 86 includes the following, indicated in the diagram of FIG. 11:

autonomousreport

Response block 86 may hold a String describing the type of autonomous report, if any, stored in the response block object.

LitespanCrc

Response block object 86 holds the CRC value taht is received from the Litespan™ telecommunications network, particularly from the connected Litespan™ terminal.

command

The TL-1 data request to the Litespan™ network. This data request is echoed back as a command prompt and saved.

commandIsDone

Response block object 86 holds a boolean (true or false) value indicating whether or not all response data corresponding to a given command has been received.

completionData

Response block object 86 holds a collection of TL-1 completion comments. Completion comments refer to the number of changed or retrieved requests.

crcBuffer

Response block 86 holds a buffer in which response data is stored as it is received. The contents of this buffer are subsequently used as the basis for the calculatedCrc.

ctag

Response block object 86 holds the ctag identifier used to connect the TL-1 response to the respective TL-1 request.

data

Response block object 86 holds a collection of valid TL-1 data.

dataBlockIsDone

Response block object 86 holds a boolean value indicating whether or not the end of the current data block has been reached.

date

Response block object 86 holds the date extracted from the header.

errorData

Response block object 86 holds a collection of TL-1 errored data and comments.

holdEvent

Response block 86 may hold a blockContinuation event received at the end of a data block if more data is expected in subsequent data blocks.

litespanCrc

Response block object 86 holds the CRC value that is received from the Litespan™ telecommunications network, particularly from the queried Litespan™ terminal or terminal component.

parserState

Response block 86 holds an instance of one of the subclasses of TL1State; this instance represents the current state of the state machine.

promptEncountered

Response block 86 holds a boolean value indicating whether or not a prompt has been received from the Litespan™ telecommunications network during parsing of response data.

pushedResponseBlocks

Response block 86 holds a collection of response blocks which have been generated in response to autonomous reports received during processing of the response block.

reset

Response block 86 holds a boolean value which allows the response block object 86 to terminate parsing of a given response block and reset the state machine.

systemName

Response block object 86 holds the system name extracted from the header.

time

Response block object 86 holds the time extracted from the header.

Current state object 82 has control of the events being evaluated and does a state change when necessary. TL-1 response block object 86 contains all parsed data and is passed to each succeeding state.

Response block object 86 is initially set up as an instance of TL1ResponseBlock class object 87 in response to the message of consumer 84. A response event 89 is created as an instance of TL1ResponseEvent class object 88 in response to an incoming TL-1 data string, retrieved from a TL-1 data block stream by serial port object 74. TL1ResponseEvent class object 88 acts as a lexer to determine the legality of each line of an incoming data string or data block. TL1ResponseBlock class object 87 passes the lines to state machine 80 via instances of TL1ResponseBlock object 86.

A role of consumer 84 is to keep a reference to the response block object 86 until the end of the TL-1 data block stream has been reached or until the current state object is a final state. At that juncture, the information stored in response block object 86 is complete and ready for passing to the requesting model object of the graphical user interface 64.

State machine 80 is implemented so that each state is encoded into a separate object from among collection or set 140, The current state object (or series of current state objects) is responsible for handling all the input events and can inherit from its parent, TL1State 162, so that the system can unconditionally give all events to the state object. The current state of the system is indicated by the current state object 82. That object will process the event and then return another state object. The state object returned may be the original state object or, if an event caused a state transition, then a different state object from among the objects in set 140 (FIG. 10). Because of the number of state changes involved, a class variable will hold an instance of a state and this instance will be released when a state change is initiated.

Figure 12A:
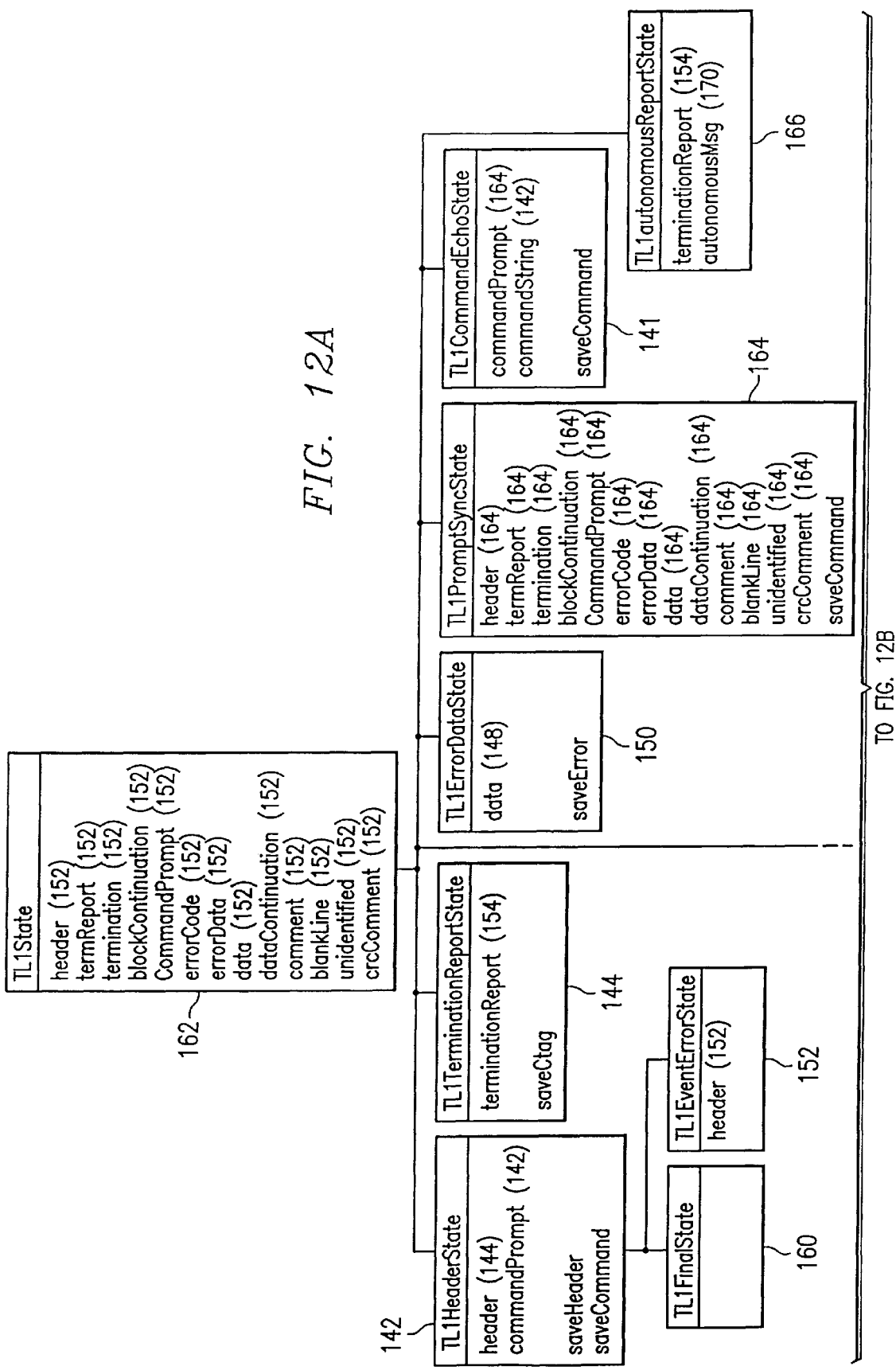
FIG. 12 is a class hierarchy diagram for the possible states of the parser of FIGS. 4 and 5 and of the object-oriented state machine included therein.

Each state name (see FIG. 10) implies that the expected event will cause a state transition. For example, header state object 142 (name: TL1HeaderState) will transmute or transit to the termination report state object 144 (name: TL1TerminationReportState) when the #header event arrives. Each state object of set 140 (FIG. 10) is an instance of the abstract class TL1State 162 or a subclass thereof The abstract class does not filly implement its protocol; no instances of abstract classes may be created. The role of the abstract class is to specify the protocol common to all of its subclasses, with the subclass providing the implementation where no common implementation can be provided in the abstract class itself. If an event is not defined in the subclass, then the event will default to the TL1State state 162 (FIG. 12). The Class Hierarchy, illustrated in FIG. 12, shows each state of the state machine, including an initialization state 164, named TL1PromptSyncState, and defines what events each state will address. In FIG. 12, numbers preceding state names are identifiers used only in the diagram, while the numbers in parentheses following each event identify the transitions to the next states, thereby identifying the Hierarchy and commonality among states. Any data that is extracted from the TL-1 string is expressed in the symbol "saveXXXX" where "XXXX" identifies the type operation being performed, examples being saveheader and savectag.

The TL1ResponseBlock class object 87 has a method, or subroutine, that is the driver for the parser. This method is code that generates instances of response block object 86. There is only one current state object and possibly several response block objects, depending on whether there are any incoming autonomous notifications or reports, as discussed hereinbelow.

TL1ResponseBlock class object 87 creates an instance of TL1ResponseBlock object 86 and assigns it the initial TL1State object 82. TL1ResponseBlock class object 87 then sends a message to the TL1ResponseBlock object 86, causing it to read a line of ASCII text from an incoming TL-1 response block TL1ResponseBlock object 86 delegates this task to serial port object 76. The data line is passed back to TL1ResponseBlock class object 87, which, in turn, passes the fine to TL1ResponseEvent class object 88, which categorizes the line and sends back an instance of TL1ResponseEvent object 89 containing a symbol that represents the event type or category of the line. TL1hesponseBlock class object 87 sends the information to the current state object 82 via the TL1ResponseBlock object 86, which causes the current state object 82 to construct a message from the symbol and the data line. The current state (currentState) object 82 then sends this message to itself with the data line as a parameter. If the event type is one that causes a state transition, a new current state object 82 is created; if no state transition is required, the same current state object 82 will be retained in the TL1ResponseBlock object 86.

As the TL1ResponseBlock class object 87 receives lines during parsing, it collects them into a variable, crcBuffer which is contained in the TL1ResponseBlock object 86, At the end of each data block from the Litespan™ network is a ASCII representation of a CCITT hexadecimal CRC code which is calculated at the connected Litespan™ terminal and which is saved in the litespanCrc variable of the response block object 86. When the data block is completely received, TL1ResponseBlock class object 87 performs a CRC check as described in concept by Greg Young et al. in EE0152 "Litespan 2000 Software-OMAPS Protected TL-1 Communications." TL1ResponseBlock class object 87 compares the two calculations. If the CRC Calculations are the same, the parsing process continues. If not, an exception is generated and a parsing error is reported to the consumer.

Figure 13:
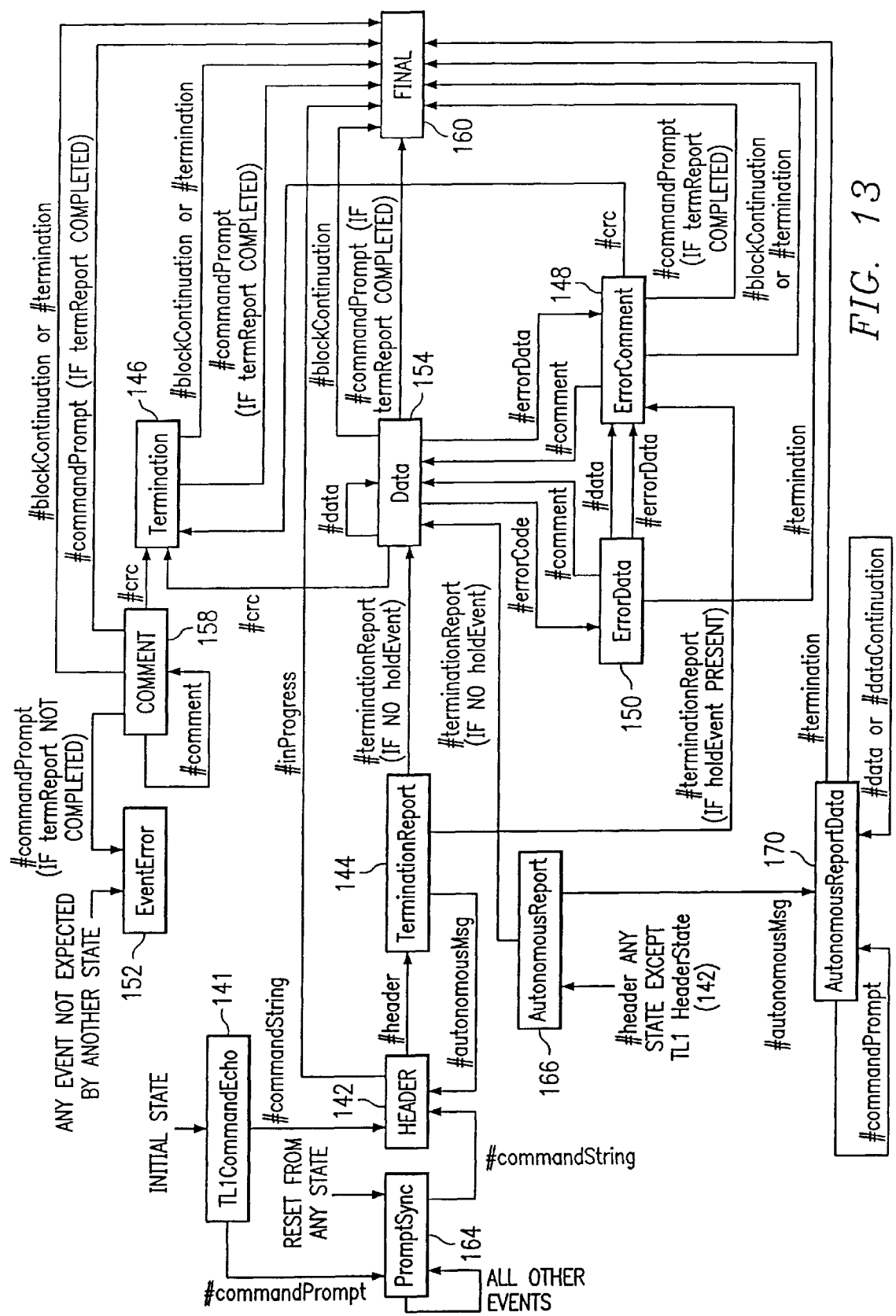
FIG. 13 is an event state diagram showing the different states of the object-oriented state machine and parser of FIGS. 4 and 5 and the transitions among the different states.

FIG. 13 is an event state diagram wherein the various possible states of the state machine are labeled with the same reference numerals as in FIGS. 10 and 12. The event state diagram shows the persistence of a state, as well as transitions to other states depending on the type of message received. In FIG. 13, the messages, which correspond to input events, are identified with the number sign (#) as a leading character. If an event is not shown as a transition or a loop, then the current state object changes to the event error state 152. An event of #reset in any state clears the holdEvent variable and changes the state to the PromptSync state 146. Events are derived from raw TL-1 data with the exception of the #reset event which is a parser-generated event, used as a means to reset all states and resync the machine.

FIG. 14 is a table of the different states of the object-oriented state machine 80 and concomitantly parser 68 (FIGS. 4 and 5), indicating the various transitions among the different states. This table sets forth the relationships among all states of the state machine 80 and substantially all possible TL-1 response events. Each state of the object oriented state machine 80 of parser 68 is assigned to a respective column of the table, while each event is assigned to a respective row. The different cells of the table indicate the state processes which result from sending the messages (or events) of the various rows to a current state object 82 having the states of the different columns, These processes include the following:

saveHeader

Extract fields from Header and save in response block object 86 (FIGS. 5, 10, 11).

noop

Do nothing.

saveCommand

Extract raw data and save in buffer of response block object 86 (see FIG. 11).

saveCtag

Extract ctag and save in ctag buffer (FIG. 11) of response block object 86; check a hold buffer of response object 86; if empty, make data state object 154 the current state object; if not empty, add raw event data to an errorData buffer (FIG. 11) of response block object 86 but do not calculate CRC and then make error comment state object 148 the current state object.

save Error

Copy raw data to an errorData buffer of response block object 86.

saveData

Copy raw data to a data buffer (FIG. 11) of response block object 86.

saveComment

Copy raw data to a comment buffer of response block object 86.

saveCRC

Exact CRC from comment and save in a hold buffer of Response block object 86.

reset

Clear hold buffer event to nil.

HoldEvent

Put current event in a hold buffer of the response block object 86; calculate CRC using raw data.

The holdEvent is a special variable used to control the state machine 80 when error data and error comments are split into different data blocks from the Litespan™ telecommunications network. This variable is used because there is no way to distinguish a data string from an error data string or an error comment string from a comment string. The holdEvent variable is used to tell the state machine to resume operation with the current state object 82 being the error data object 150 or the error comment object 148. The error data would be carried to the next response block object but would not be calculated into the crcCalculated variable.

To start state machine 80, the TL1ResponseBlock class object 87 invokes the state object TL1State create. This creates an instance of the TL1PromptSync state 164. TL1ResponseBlock class object 87 holds references to this state and a reference to the response block object 86. TL1ResponseEvent class object 88 starts reading a line of TL-1 data from the data stream and creates an instance of itself, i.e., response event object 89, to translate the TL-1 data into an event. The particular TL-1 response event block object 89 is then passed into the state machine process with the response block object 86. At this point a loop is established till all the TL-1 data has been parsed. The consumer verifies CRC upon completion and detects and corrects any out-of-sync operation.

Handling of Autonomous Reports

The state diagram of FIG. 13 depicts what happens in the object-oriented state machine 80 upon the reception of an autonomous report or notification from the telecommunications network. The current state object, which may generally be any state indicated in FIGS. 10, 12, 13, or 14, replaces itself with a new state object 166 called the TL1AutonomousReportState object. In addition, when an autonomous report or notification is received by parser 68, consumer 84 generates another response block object 168 (FIG. 5) for holding report data and inserts a pointer in the original response block object 86 to the new response block object 168. The pointer identifies the second response block object 168 and prevents the closure or delivery of the original response block object 86 to its client application (usually the graphical user interface 64) until the completion, closure or population of the second response block object 168.

When the current state object of the parser 68 is TL1AutonomousReport object 166, the expected event is a line containing a code describing the type of autonomous report. This line of code is identified, for example, by the initial character "A" or by the string "REPT" or the string "CANC", and is identified in the drawings as "autonomousMsg." The arrival of this line of code causes a transition to another state 170, called the TL1AutonomousReportDataState. In this state 170, the state machine 80 of parser 68 expects data pertaining to the autonomous report or notification. The arrival or a termination message (";"), indicating that the entire autonomous report or notification has been received, causes a state transition to the final state 160. Subsequently, the state of machine 80 reverts to the state which existed when the autonomous report arrived. This identity of this prior state is preserved as a reference in TL1ResponseBlock object 86. A completion report is generated to let the parser 68 know that the entire data block of the autonomous report has been received. This completion report, together with the data received, is stored in response block object 168 (see FIGS. 5 and 10).

It is possible for more than one autonomous report to arrive prior to the reception of the last data block for the TL-1 request that generated the original response block object 86. In this case, other response block objects 172 are generated and processed as discussed above. Earlier generated response block objects have pointers which identify subsequently generated response block objects and thereby establish a hierarchical tree structure. In accordance with the tree structure, earlier response block objects await the completion, closure or population of subsequent response block objects. Only after all response block object have been filled or completed will all the response block objects be delivered to their respective clients or targets.

Other states may be added to the state diagram of FIG. 13, if necessary for parsing, e.g., for error handling, etc. In fact, an advantage of using an object-oriented state machine for parsing a TL-1 data stream is the ease at which additional states may be added. Such additional states may be necessary, for example, if the language of the telephony system changes.

A new state machine is invoked and a new response object is created each time a new autonomous report arrives over data link 74 from the network. Generally, each autonomous report which arrives during the reception of a TL-1 response is parsed before the parsing of the TL-1 response is completed. Should a first autonomous report comprise multiple data blocks and a second autonomous report arrive before the last of the data blocks of the first autonomous report, then another autonomous report response block object will be created and another state machine invoked per FIG. 13. A pointer is inserted in the first autonomous report response block object which points to or identifies the second autonomous report response block object. The first autonomous report response block object will not be directed to its intended recipient until a completion message is sent indicating that the second autonomous report response block object is completely populated.

Broadband End-to-End Cross-Connection

One of the provisioning operations performable via craft interface device 63 is the establishment of a broadband end-to-end cross-connection. To that end, craft interface device 63 includes a path hunting module 174 (FIG. 4) which is part of a broader framework of functional module 176 and code groupings. The selection of two end points for a broadband end-to-end cross-connection is made by the user's manipulation of the display interactive mouse 72 to "click on" the two end points, Generally, the two end points are displayed in respective browser windows provided on monitor 70 by graphical user interface in response to the selection of those windows by the user as described hereinabove.

Generally, the selection of an end point for a broadband end-to-end cross-connection is made using the Common Control Assembly (CCA) display screen or window depicted in FIG. 8. Equipment graphically represented in pane 118 includes one or more broadband cards 196. For a end point of a broadband end-to-end cross-connection, the user clicks on a broadband card 196. The selected card and its facilities are then graphically represented in facilities pane 120. A facility of the selected broadband card may be selected for the broadband end point.

Figure 15:
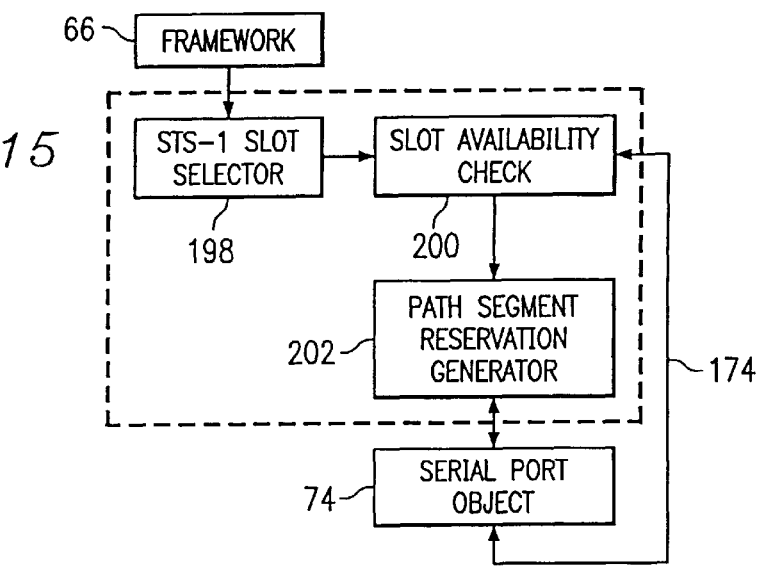
FIG. 15 illustrates a path hunting module used by the invention.

Upon the selection of two end points as discussed above, this selection being detected by graphical user interface 64, path hunting module 174 operates to automatically establish a broadband path between the selected end points in the telecommunications network. Path hunting module 174 first finds an available path through the network from the first end point to the second end point. These end points are located in different terminals or nodes 12 of the network so that path hunting module 174, together with functional modules or code of framework 66, must generate inquiries which are transmitted over data link 74 to the relevant terminals 12 to ascertain the availability of STS-1 time slots for the intended broadband end-to-end cross-connection, As illustrated in FIG. 15, module 174 includes a functional component 198 for selecting an STS-1 channel or time slot. Where STS-1 slots are identified by numerically ordered designations, module component 198 picks a numerically first STS-1 time slot initially and subsequently picks successive time slots as the previously picked slots are found to be unavailable. Path hunting module 174 also includes a component 200 for inquiring whether STS-1 channel or time slot selected by component 198 is available at the terminals where the selected end points are located and then at any intervening terminals. Component 200 includes functionality for identifying intermediate terminals and for generating and processing TL-1 commands or inquiries as to the availability of the selected time slot. Path hunting module 174 further includes a component 202 for generating a TL-1 command or instruction reserving an STS-1 slot for use in the intended broadband end-to-end cross-connection once that slot has been found to be available across the entire path. This reservation of the time slot is done in a sequence for successive segments along the path.

Figure 16:
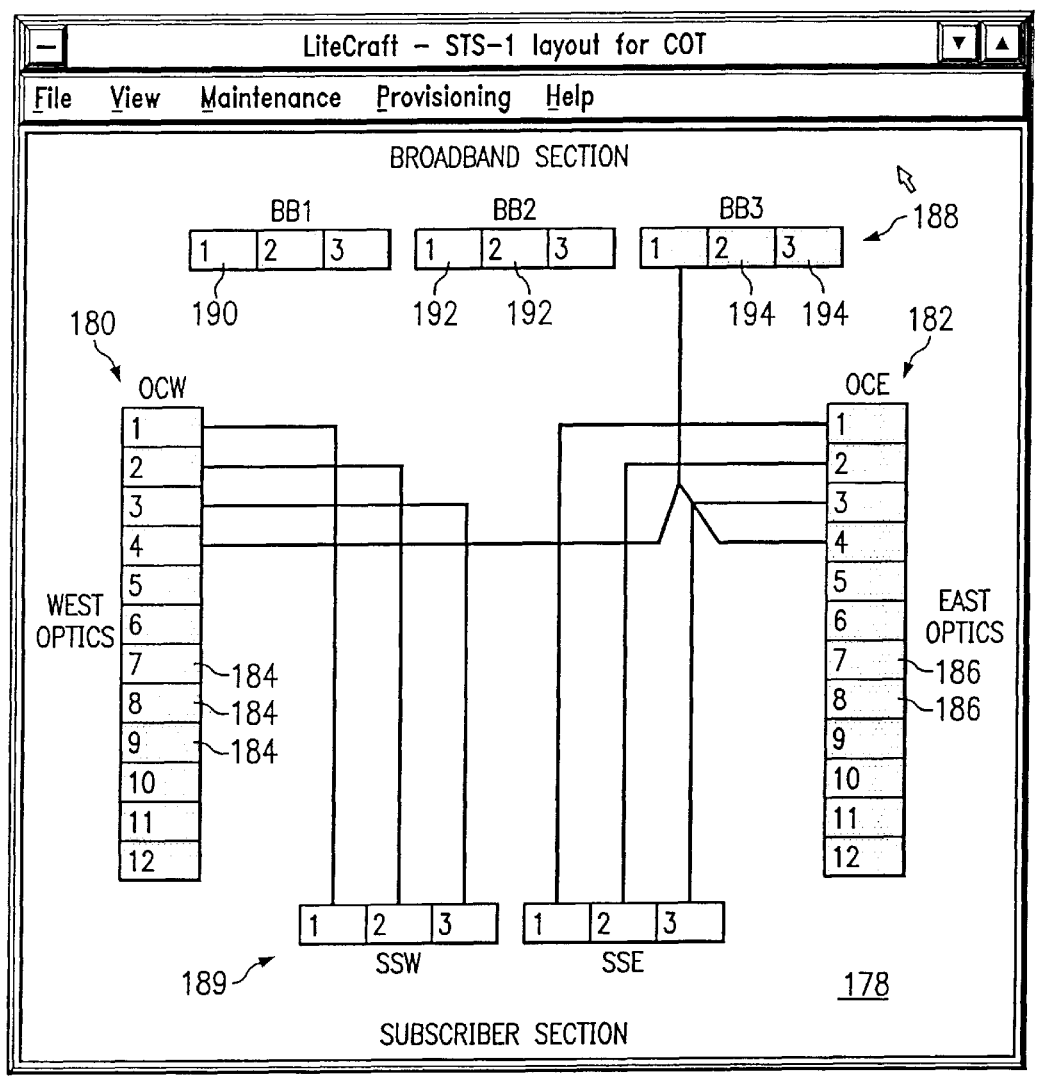
FIG. 16 illustrates an STS-1 layout window which can be provided to a user.

FIG. 16 shows an STS-1 layout window which is opened by graphical user interface, pursuant to the "Lazy Retrieval" technique discussed above, upon the user's selection of optical carrier facilities west (OCW) 114 or east (OCE) 116. This STS-1 layout window could be accessed by a user for purposes of manually establishing a broadband end-to-end cross-connection manually. The STS-1 layout window includes a cross-connections pane 178 which shows STS-1 facilities as one or two columns 180 and 182 of boxes 184 and 186 along the right side (OCE) or left side (OCW) of the screen, depending on whether the selected facilities include east optics, west optics, or both Where the system has OC-3 optics, pane 178 will show a column of three boxes (not shown) of three boxes representing the three STS-1s in an OC-3. The system corresponding to FIG. 16 has OC-12 optics. The twelve boxes 184 and 186 in columns 180 and 182 respectively represent twelve STS-1s in an OC-12. Cross-connections pane 178 also shows a broadband section 188 and a subscriber section 189. Broadband section 188 includes three groups of three boxes 190, 192, 194, each group of three boxes representing a respective broadband card (or pair of cards, where one card is a backup).

A craft person can use the display screen of FIG. 16 to manually select a broadband box 190, 192, 194 and an STS-1 to establish a first segment of a broadband path. This selection, as well as the locating and reserving of other path segments, is accomplished automatically by path hunting module 174.

Figure 17:
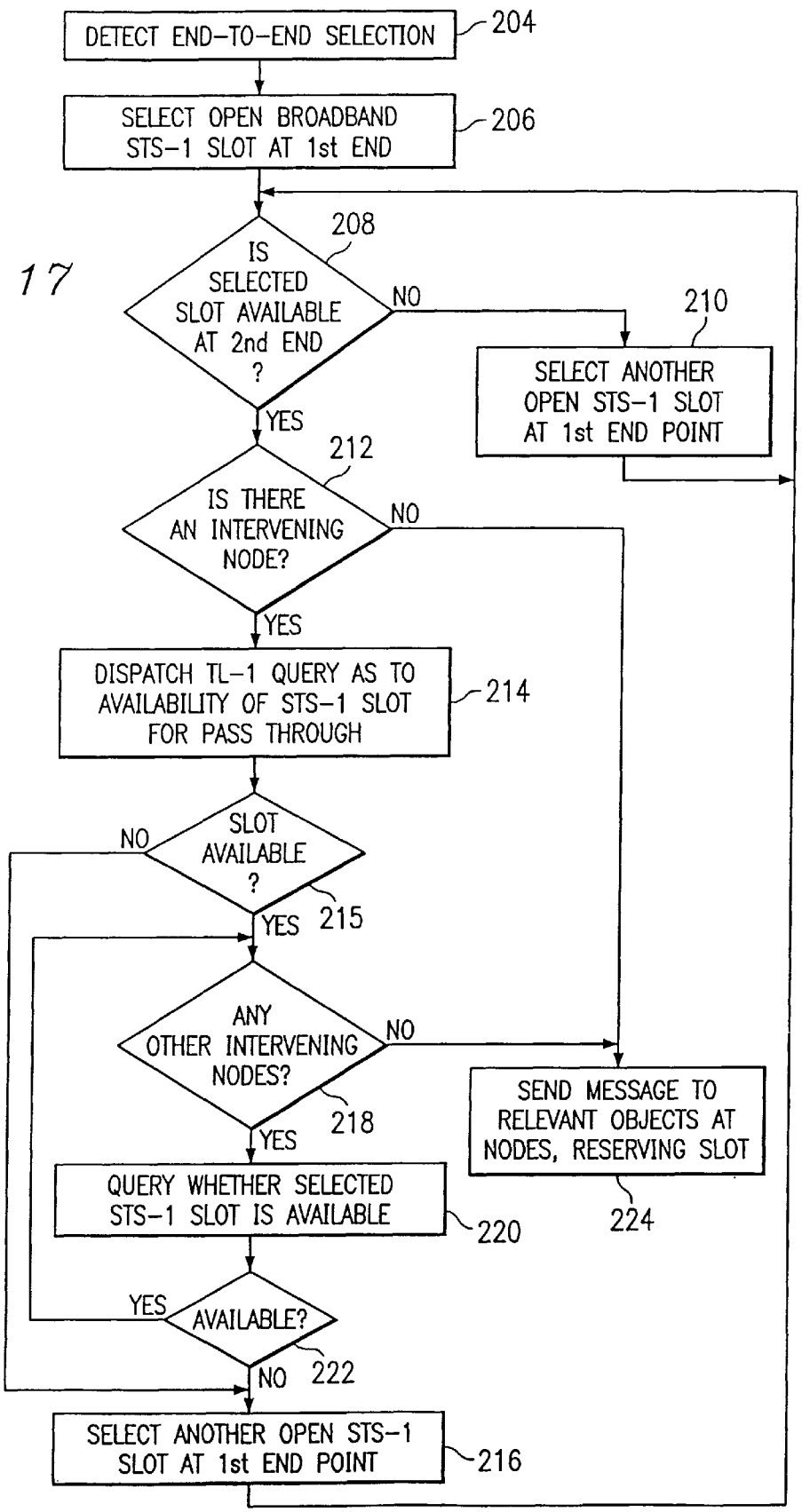
FIG. 17 is a flow-chart diagram that shows operations performed according to the invention.

As illustrated schematically in the flow-chart diagram of FIG. 17, once a selection of broadband end points in respective terminals or nodes 12 is detected in a step 204, path hunting module 174 selects an open broadband STS-1 slot at the first end in a step 206. This selection step 206 involves the transmission to the first end terminal of a TL-1 inquiry as to the availability of a selected STS-1 slot in the appropriate OC facilities of that first end terminal. Module 174 then determines at a decision junction 208 whether the selected STS-1 slot is available at the second end terminal. This determination likewise involves the transmission to the second end terminal of a TL-1 inquiry as to the availability of the selected STS-1 slot in the appropriate OC facilities of that second end terminal. If that slot, available at the first end terminal, is not available at the second end terminal, path hunting module 174 selects another STS-1 slot in a step 210 and checks whether that slot is available at the first end terminal. If the originally selected slot is indeed available at both the first end terminal and the second end terminal, path hunting module 174 then checks the network map at a decision junction 212 to determine whether there is an intervening node and, if so, module 174 generates a TL-1 inquiry 214 transmitted to the intervening node for determining whether the selected STS-1 slot is available for pass through at that intervening node. If the slot is not available, as determined at a junction 215 another STS-1 slot available at the first end terminal is selected in a step 216. If the slot is available, an investigation 218 is conducted as to the existence of further intervening nodes. The existence of an additional intervening node induces path hunting module 174 to generate a TL-1 inquiry in a step 220 to determine whether the selected STS-1 slot is available for pass through in this second intervening node. If the selected STS-1 slot is available at that additional node as determined at a junction 222, and in all involved terminals, a message is dispatched in a step 224 to reserve the STS-1 slot at all those terminals. As described above, this reservation process is implemented sequentially for successive segments along the path.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof

What is claimed is:

1. A craft interface device for accessing a telecommunications network for purposes of maintenance and provisioning, said network including a plurality of levels or layers of interactive structure, comprising:

a graphical user interface for providing on a monitor a sequence of graphical representations of operatively interconnected network objects in a respective layer of the telecommunications network, whereby a user can navigate graphically through said network from a highest hierarchical level of network objects to a lowest hierarchical level of objects and operational interrelationships, said graphical user interface being operatively connected to a display interactive user input component for detecting user selection via said input component of a broadband first end point displayed in a first window by said graphical user interface and a broadband second end point displayed in a second window by said graphical user interface; and connection means operatively connected to said graphical user interface and to said network for automatically establishing a broadband end-to-end cross-connection in the network in response to the user selection via said input component of said first end point and said second end point.

2. The craft interface device defined in claim 1, further comprising the input component.

3. The craft interface device defined in claim 2 wherein said input component is a mouse, said graphical user interface being operatively connected to said mouse for detecting an actuation of a button of said mouse when a mouse-controlled pointer on said monitor is at least partially disposed over one of said first end point and said second end point.

4. The craft interface device defined in claim 3 wherein said connection means is operatively connected to said network via a data link for automatically discovering an available broadband telecommunications path in said telecommunications network between said first end point and said second end point and for automatically reserving said path.

5. The craft interface device defined in claim 4 wherein said first end point is located in a first terminal of said network and said second end point is located in a second terminal of said network said connection means including means for identifying an available STS-1 time slot in an optical carrier at said first terminal and in an optical carrier at said second terminal.

6. The craft interface device defined in claim 5 wherein said first terminal and said second terminal are connected to one another via at least one other terminal, said connection means further including means for checking said other terminal for availability of said STS-1 time slot for pass through in said other terminal, said connection means including means for reserving said STS-1 time slot in said first terminal said second terminal and said other terminal.

7. The craft interface device defined in claim 1 wherein said first end point is located in a first terminal of said network and said second end point is located in a second terminal of said network, said connection means including means for identifying an available STS-1 time slot in an optical carrier at said first terminal and in an optical carrier at said second terminal.

8. The craft interface device defined in claim 2 wherein said first terminal and said second terminal are connected to one another via at least one other terminal, said connection means further including means for checking said other terminal for availability of said STS-1 time slot for pass through in said other terminal, said connection means including means for reserving said STS-1 time slot in said first terminal, said second terminal and said other terminal.

9. The craft interface device defined in claim 1 wherein said connection means is operatively connected to said network via a data link for automatically discovering an available broadband telecommunications path in said telecommunications network between said first end point and said second end point and for automatically reserving said path.

10. A method for accessing a telecommunications network for purposes of maintenance and provisioning, said network including a plurality of levels or layers of interactive structure, said method comprising:

displaying, on a monitor, a first browser window showing a graphical representation of broadband facilities at a first terminal of the telecommunications network;

detecting user selection via a display interactive input component of a broadband first end point displayed in said first browser window;

displaying, on said monitor, a second browser window showing a graphical representation of broadband facilities at a second terminal of the telecommunications network;

detecting user selection via said display interactive input component of a broadband second end point displayed in said second browser window; and automatically establishing a broadband end-to-end cross-connection in the network in response to the user selection via said input component of said first end point and said second end point.

11. The method defined in claim 10 wherein said input component is a mouse, the detecting of user selection including detecting an actuation of a button of said mouse when a mouse-controlled pointer on said monitor is at least partially disposed over one of said first end point and said second end point.

12. The method defined in claim 11 wherein the establishing of said cross-connection includes automatically discovering an available broadband telecommunications path in said network between said first end point and said second end point and automatically reserving said path.

13. The method defined in claim 12 wherein the establishing of said cross-connection includes automatically identifying an available STS-1 time slot in an optical carrier at said first terminal and in an optical carrier at said second terminal.

14. The method der in claim 13 wherein said first terminal and said second terminal are connected to one another via at least one other terminal, the establishing of said cross-connection further including;

automatically checking said other terminal for availability of said STS-1 time slot for pass through in said other terminal; and automatically reserving said STS-1 time slot in said first terminal, said second terminal and said other terminal.

15. The method defined in claim 10 wherein the establishing of said cross-connection includes automatically discovering an available broadband telecommunications path in said network between said first end point and said second end point and automatically reserving said path.

16. The method defined in claim 10 wherein the establishing of said cross-connection includes automatically identifying an available STS-1 time slot in an optical carrier at said first terminal and in an optical carrier at said second terminal.

17. The method defined in claim 16 wherein said first terminal and said second terminal are connected to one another via at least one other terminal, the establishing of said cross-connection further including:

automatically checking said other terminal for availability of said STS-1 time slot for pass through in said other terminal; and automatically reserving said STS-1 time slot in said first terminal said second terminal and said other terminal.

\* \* \* \* \*